United States Patent
Holden

(10) Patent No.: US 9,467,531 B1
(45) Date of Patent: Oct. 11, 2016

(54) METHOD AND SYSTEM FOR INTEGRATION OF USER-GENERATED CONTENT WITH SOCIAL MEDIA CONTENT MANAGEMENT SYSTEM

(71) Applicant: Matthew Gerard Holden, San Francisco, CA (US)

(72) Inventor: Matthew Gerard Holden, San Francisco, CA (US)

(*) Notice: Subject to any disclaimer, the term of this patent is extended or adjusted under 35 U.S.C. 154(b) by 271 days.

(21) Appl. No.: 14/324,211

(22) Filed: Jul. 6, 2014

(51) Int. Cl.
*G06F 15/16* (2006.01)
*H04L 29/08* (2006.01)

(52) U.S. Cl.
CPC ................... *H04L 67/306* (2013.01)

(58) Field of Classification Search
None
See application file for complete search history.

(56) References Cited

U.S. PATENT DOCUMENTS

| | | | |
|---|---|---|---|
| 8,166,132 B1* | 4/2012 | Mooneyham | H04L 65/602 709/203 |
| 8,385,950 B1* | 2/2013 | Wagner | H04L 67/06 455/414.2 |
| 8,788,334 B2* | 7/2014 | Rose | G06Q 30/02 705/14.4 |
| 2009/0007221 A1* | 1/2009 | Kim | G06F 21/10 726/1 |
| 2009/0132341 A1* | 5/2009 | Klinger | G06Q 30/02 705/14.12 |
| 2010/0268728 A1* | 10/2010 | Tadlock | G06F 17/30035 707/769 |
| 2010/0318405 A1 | 12/2010 | Kirkby | |
| 2011/0112899 A1 | 5/2011 | Strutton | |
| 2012/0066082 A1* | 3/2012 | Sadler | G06Q 30/0277 705/26.1 |
| 2012/0095859 A1* | 4/2012 | Yu | G06Q 30/0601 705/26.1 |
| 2012/0137316 A1* | 5/2012 | Elizarov | H04H 20/38 725/9 |
| 2013/0297426 A1* | 11/2013 | Marx | G06Q 30/0269 705/14.66 |
| 2014/0129627 A1* | 5/2014 | Baldwin | H04L 67/306 709/204 |
| 2014/0278968 A1* | 9/2014 | Strompolos | G06Q 30/0249 705/14.52 |
| 2014/0325577 A1* | 10/2014 | Garcia Mendoza | H04L 67/26 725/115 |

\* cited by examiner

*Primary Examiner* — Kenny Lin
(74) *Attorney, Agent, or Firm* — Nishant Jaiswal

(57) ABSTRACT

A method and a social media content management system (SCMS) (104) to manage user-generated content across one or more social media networks are disclosed. The SCMS (104) comprises a specialized computer system coupled with the communication network (102). The specialized computer system generates a user-generated content (UGC) uploader based on uploader preference. The UGC uploader enables a pre-authorized user to send user-generated content for a customer associated with the SCMS (104). The pre-authorized user has an established trust relationship with the customer such that the pre-authorized user is allowed to send the user-generated content for the customer. Thereafter, the specialized computer system sends the UCG uploader to the pre-authorized user and receives the user-generated content send by the pre-authorized user. The SCMS (104) also includes a database coupled with the specialized computer system to store the user-generated content such that the user-generated content is accessible to the customer.

20 Claims, 15 Drawing Sheets

FIG. 4

CAMPAIGN REPORTER

Select Campaign — 1302

Campaign Name

| Number of Videos | Total Posts | Videos Published | Posted Messages | Scheduled Messages |
|---|---|---|---|---|
| 18 — 1304 | 14 — 1306 | 6 — 1308 | 2 — 1310 | 9 — 1312 |

Status of Video Posts

| Social Media | Videos Planned | Not Started | Scheduled | In Progress | Published |
|---|---|---|---|---|---|
| Facebook | 8 | 3 | 2 | 1 | 2 |
| LinkedIn | 10 | 2 | 3 | 1 | 4 |

1314

Status of Posts

| Social Media | Saved | Scheduled | Published | Status |
|---|---|---|---|---|
| Facebook | 5 | 3 | 2 | Started |
| LinkedIn | 9 | 6 | 0 | Not Started |

METHOD AND SYSTEM FOR INTEGRATION OF USER-GENERATED CONTENT WITH SOCIAL MEDIA CONTENT MANAGEMENT SYSTEM

RELATED APPLICATION

This application is related to U.S. patent application Ser. No. 14/324,207, entitled, "METHOD AND A SOCIAL MEDIA CONTENT MANAGEMENT SYSTEM FOR MANAGING USER-GENERATED CONTENT", to Matthew Gerard Holden, filed on Jul. 6, 2014, which is incorporated by reference herein for all that it teaches and discloses.

FIELD OF THE INVENTION

The present invention relates generally to content management and in particular to using a Social Media Content Management System (SCMS) for procuring and managing user-generated content.

BACKGROUND

Marketers and advertisers increasingly use social media networks, such as Facebook®, Twitter®, LinkedIn®, MySpace®, Google+®, Tumblr®, YouTube®, Youku®, Weibo®, Renren® and others to run social media campaigns. The social media campaigns enable the marketers to connect with customers, followers, fans, employee, and members of the social media network. These social media networks provide tools, such as Facebook® pages, or Twitter® handles to implement the social media campaigns.

Typically, a social media campaign is a marketing campaign that runs on social media networks. The social media campaign may include messages, advertisements, notifications, promotional information, public service announcements, news, event announcements etc. published on one or more social media networks. These social media campaign may include a series or grouping of advertisements or messages relating to a particular corporation, product, or theme. For example, a social media campaign may relate to a corporation, such as Samsung® and provide details of its upcoming products. A social media campaign may also relate to a theme and provide a series of advertisements or messages around a certain time of the year (e.g. fall, holiday, summer), certain dates (e.g. Halloween, Christmas, Father's day, Independence Day), or certain subject (e.g. baseball season, football season, back to school) and so forth.

A social media campaign may span across multiple social media networks or be directed to only one such network. For example, a large multinational corporation such as Apple®, may develop separate Facebook® pages for each product line, such as iPod® where followers, fans, customers, and potential buyers can post comments, reviews and share content. Apple® may also create different Facebook® pages for each country. Similarly, Apple® may have multiple Twitter® handles and YouTube® channels for each product line.

Marketing on social media networks is witnessing a paradigm shift with the increase in the popularity of user-generated content (UGC). User-generated content refers to any content created and uploaded to the Internet by a non-media professional, for example, a professional quality video uploaded on YouTube®, a product feedback left on Amazon® website, an image posted on Instagram®, or a massage posted on Facebook®.

On social media networks, such as Facebook® success of social media campaign depends to a great extent on member participation, sharing and posting of content, such as, messages, likes, and comments etc. Researches have shown that a member of a social media network is more likely to contribute or participate in a social media campaign when he/she notices that other members are participating and contributing.

To ensure success of social media campaign, marketers provide various incentives and promotion schemes to members who contribute user-generated content to their social media campaigns. User-generated content not only adds to the credibility of the social media campaign but also helps in reaching out to a wider audience. None of the existing solutions provide an integrated solution to procure and use user-generated content in a social media campaign. Also, none of the existing solutions provide an integrated management of user-generated content across social media campaigns.

In addition, the advent of the wearable computing devices such as smart watches, for example, Sony SmartWatch® and Samsung Galaxy Gear®, and smart glasses, such as Google Glass® have led to further proliferation of the user-generated content. None of the existing solutions provide an integrated system for procuring, utilizing and managing user-generated content from such wearable computing devices.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

FIG. 4 is a block diagram illustrating UGC uploader interface 400, in accordance with an embodiment;

FIG. 13 is a block diagram illustrating a Campaign Reporter 1300, in accordance with an embodiment;

Figure 1:
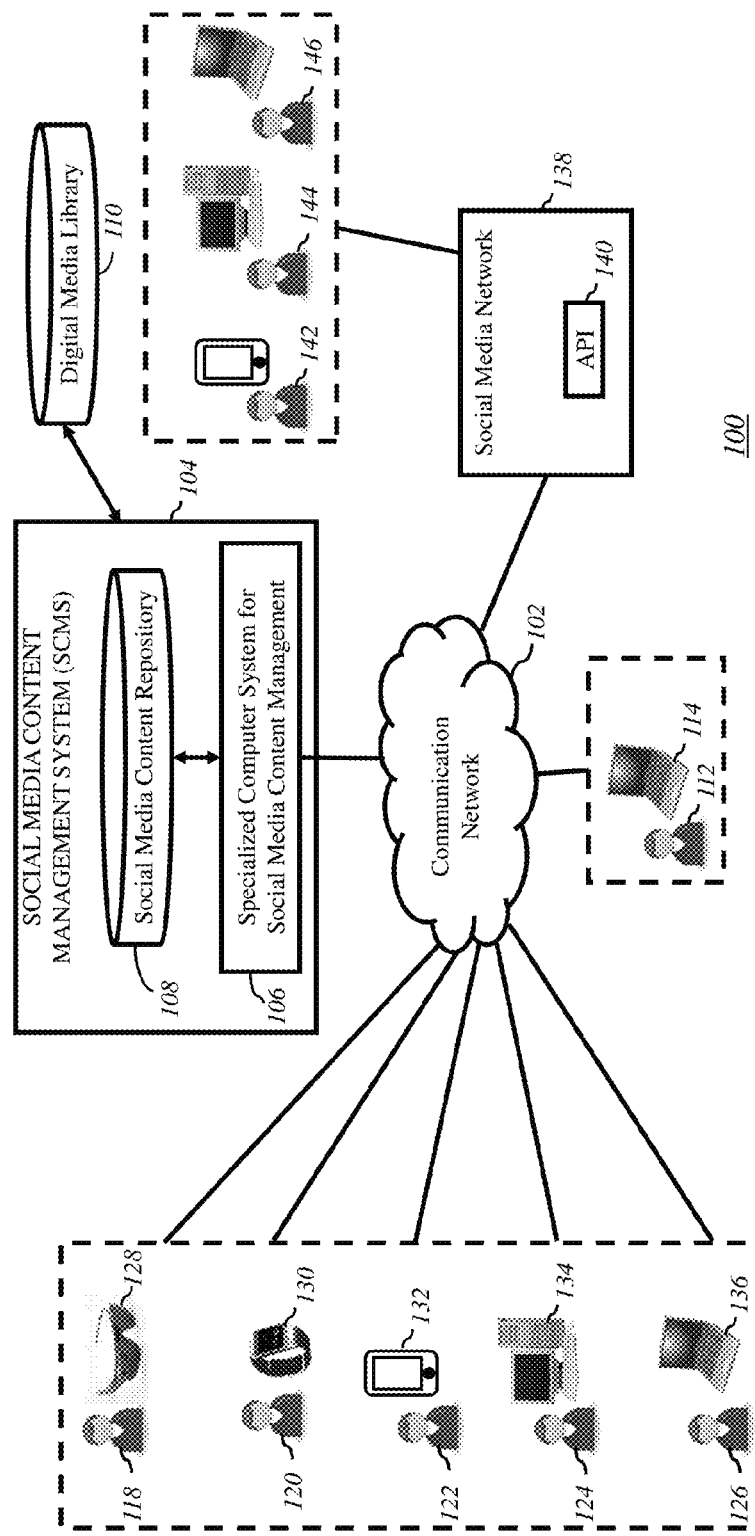
FIG. 1 is example block diagram that illustrates an environment 100 in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DESCRIPTION

Before describing in detail the particular method and a social media content management system (SCMS) for managing social media content across one or more social media networks, in accordance with various embodiments of the present invention, it should be observed that the present invention resides primarily in the SCMS for managing user-generated content. In this document, the terms "comprises," "comprising," or any other variation thereof, are intended to cover a non-exclusive inclusion, such that a process, method, article or apparatus that comprises a list of elements does not include only those elements, but may include other elements that are not expressly listed or inherent in such a process, method, article or apparatus. An element proceeded by "comprises . . . a" does not, without more constraints, preclude the existence of additional identical elements in the process, method, article or apparatus that comprises the element.

The term "another," as used in this document, is defined as at least a second or more. The terms "includes" and/or "having," as used herein, are defined as comprising. The term "program," as used herein, is defined as a sequence of instructions designed for execution on a specialized computer system. A "program," or "computer program," may include a subroutine, a function, a procedure, an object method, an object implementation, an executable application, an applet, a servlet, a source code, an object code, a shared library/dynamic load library and/or other sequence of instructions designed for execution on a specialized computer system.

In an embodiment, a social media content management system (SCMS) is provided. The SCMS is operatively connected to one or more social media networks through a communication network. The SCMS includes a specialized computer system coupled to the communication network. The specialized computer system manages user-generated content in the communication network. The specialized computer system is configured for determining uploader preference for generating a UGC uploader. The UGC uploader enables a pre-authorized user to upload user-generated content for a customer. The UGC uploader includes instructions for encoding the user-generated content to uniquely identify the user-generated content with the customer. The customer is associated with the SCMS and the pre-authorized user has an established trust relationship with the customer such that the pre-authorized user is allowed to send the user-generated content for the customer. The specialized computer system generates the user-generated content (UGC) uploader and sends the UCG uploader to the pre-authorized user. The specialized computer system is further configured for receiving the user-generated content from the pre-authorized user. The pre-authorized user sends the user-generated content using the UGC uploader. The specialized computer system is also configured for using the user-generated content in a social media campaign of the customer. The SCMS further includes a cloud-based social media content repository coupled to the specialized computer system. The cloud-based social media content repository is for storing the user-generated content such that the user-generated content is accessible to the customer and for storing information about the social media campaign of the customer.

In an embodiment, the specialized computer system is configured to include a required specification of the user-generated content in the UGC uploader so that the required specification of the user-generated content is delivered to the pre-authorized user. The UGC uploader sends the user-generated content for the customer when the user-generated content meets the required specification.

In an embodiment, the UGC uploader is configured to associate metadata with the user-generated content. The metadata is based on at least one of the pre-authorized user, the customer, the user-generated content, a consumer brand associated with the user-generated content, purpose of the user-generated content, time of creation of the user-generated content, author of the user-generated content, software environment of creation of the user-generated content, hardware environment of creation of the user-generated content, and a standard associated with the user-generated content.

In an embodiment, a method for managing user-generated content using an SCMS is disclosed. The SCMS is operatively connected to one or more social media networks through a communication network. The method at the SCMS comprises using a specialized computer system, generating a user-generated content (UGC) uploader based on received uploader preference. The UGC uploader enables a pre-authorized user to upload user-generated content for a customer. The UGC uploader includes instructions for encoding the user-generated content to uniquely identify the user-generated content with the customer. The customer is associated with the SCMS and the pre-authorized user has an established trust relationship with the customer such that the pre-authorized user is allowed to send the user-generated content for the customer. The method further comprises, sending the UCG uploader to the pre-authorized user and receiving the user-generated content from the pre-authorized user. The pre-authorized user sends the user-generated content using the UGC uploader. The method also comprises storing the user-generated content in a cloud based social media content repository coupled to the specialized computer system such that the user-generated content is accessible to the customer and utilizing the user-generate content in a social media campaign of the customer.

In an embodiment, the invention provides a non-transitory computer-readable storage medium storing instructions for providing a user-generated content (UGC) uploader. The instructions when executed by a processor cause the processor to perform operations comprising determining uploader preference for generating a UGC uploader. The uploader preference specifies one or more functionalities of the UGC uploader. The functionality is at least one of from the group comprising capturing an image, recording a video, recording an audio, and receiving text input. The operations further comprising determining required specification of user-generated content. The required specification of the user-generated content comprises at least one of from the group comprising a required format of the user-generated content, a required content of the user-generated content, and a predefined set of rules for the user-generated content. The operations further comprise encoding the user-generated content to uniquely identify it with a customer. The customer is associated with a social media content management system (SCMS). The pre-authorized user has an established trust relationship with the customer such that the pre-authorized user is allowed to send the user-generated content for the customer. The operations also comprise saving the user-generated content in a UGC database associated with the pre-authorized user and sending the user-generated content to the SCMS.

In an embodiment, a social media content management system (SCMS) to manage user-generated content across one or more social media networks is disclosed. The SCMS is operatively connected to one or more social media networks through a communication network. The SCMS includes a specialized computer system coupled with the communication network. The specialized computer system is configured for receiving a user-generated content from a pre-authorized user. The pre-authorized user utilizes a user-generated content (UGC) uploader to send the user-generated content for a customer. Typically, the customer is associated with the SCMS. The pre-authorized user has an established trust relation with the customer such that the pre-authorized user is allowed to send the user-generated content for the customer. The user-generated content has been encoded such that it can be uniquely identified with the customer. The specialized computer system is configured for associating the user-generated content with the customer, comparing the user-generated content with a required specification of the user-generated content, and associating metadata with the user-generated content. The specialized computer system is also configured for using the user-generated content in a social media campaign of the customer. Typically, the specialized computer system generates the UGC uploader for the pre-authorized user.

The SCMS also includes a cloud-based social media content repository coupled with the specialized computer system. The cloud-based social media content repository is configured to store the user-generated content and to provide a UGC interface to access the user-generated content from the cloud-based social media content repository. The user-generated content is to be used in the social media campaign of the customer. The cloud-based social media content repository also provides an interface with a digital media library. The interface with the digital media library enables the customer to access a third party content from the digital media library. Typically, the third party content is used in the social media campaign of the customer.

In an embodiment, the required specification of the user-generated content includes at least one of a required format of the user-generated content, a required content of the user-generated content, and a predefined set of rules for the user-generated content. Typically, the required format of the user-generated content includes at least one of a text format, an image format, a video format, an audio format, and a custom format.

In an embodiment, the metadata includes at least one of the pre-authorized user, the customer, the user-generated content, a consumer brand associated with the user-generated content, purpose of the user-generated content, time of creation of the user-generated content, author of the user-generated content, software environment of creation of the user-generated content, hardware environment of creation of user-generated content, and a standard associated with the user-generated content. Typically, the customer specifies the metadata to be associated with the user-generated content.

In an embodiment, the specialized computer system provides a workflow system. The workflow system enables performing a sequence of operations on the user-generated content for using the user-generated content in the social media campaign of the customer. Typically, the sequence of operations includes at least one of editing the user-generated content, adding content to the user-generated content, removing content from the user-generated content, approving the user-generated content, modifying the metadata associated with the user-generated content, modifying the user-generated content to conform with a social media network, and modifying the user-generated content based on requirements of the communication network.

In an embodiment, the SCMS includes a workflow interface component integrating the SCMS with a third party workflow system. The third party workflow system is at least one of a Customer Relation Management (CRM) system, a Supply Chain Management (SCM) system, an Enterprise Resource Planning (ERP) system, a Human Resource Management (HRM) system, and a Marketing Management System (MMS).

In an embodiment, the specialized computer system includes a Campaign Manager for managing the social media campaign. The campaign manager includes an interface for accessing social media campaign tools, creating the social media campaign, selecting a social media network for launching the social media campaign, launching the social media campaign, modifying the social media campaign, and terminating the social media campaign.

In an embodiment, the Campaign Manager enables the customer to define parameters for the social media campaign. The parameters include at least one of launch date of the social media campaign, launch time of the social media campaign, end date of the social media campaign, end time of the social media campaign, a language for the social media campaign, a social media network for the social media campaign, a country for the social media campaign, a geographic region for the social media campaign, a demography for the social media campaign, and rules for participation in the social media campaign.

In an embodiment, the specialized computer system includes a Social Inbox. The Social Inbox includes a display interface for depicting activities associated with the social media campaign, a filter component for segmenting activities associated with the social media campaign based on at least one filter parameter specified by the customer, and a campaign monitor for monitoring the social media campaign across the one or more social media networks.

In an embodiment, the specialized computer system includes an Analytics Engine. The Analytics Engine includes a dashboard for displaying analytics of the social media campaign, and a campaign reporter for providing reports of the social media campaign.

In an embodiment, the specialized computer system is further configured to automatically use the user-generated content in a social media campaign of the customer when the user-generated content meets the predefined parameters set by the customer.

In an embodiment, the specialized computer system includes a UGC network manager. The UGC network manager is configured to manage a trusted social network of the customer. The trusted social network of the customer includes the customer and one or more pre-authorized users. The one or more pre-authorized users have an established trust relation with the customer such that each of the one ore more pre-authorized users are allowed to send the user-generated content for the customer.

In an embodiment, the UGC interface provides a search interface enabling the customer to search for the user-generated content in the cloud-based social media content repository.

In an embodiment, the specialized computer system generates the UGC uploader for the pre-authorized user. Typically, the UGC uploader includes instructions for encoding the user-generated content to uniquely identify the user-generated content with the customer. The instructions for encoding the user-generated content includes instruction for encoding the user-generated content using a key. The key is a unique identifier for the user-generated content and is used to encrypt the user-generated content. The key indicates that the user-generated content is encoded for the customer. In an embodiment, the key indicates that the user-generated content is for a social media campaign of the customer.

In an embodiment, the specialized computer system is configured to include a required specification of the user-generated content in the UGC uploader so that the required specification of the user-generated content is delivered to the pre-authorized user. Typically, the UGC uploader uploads or sends the user-generated content for the customer when the user-generated content meets the required specification.

In an embodiment, the UGC uploader integrates with a computing device of the pre-authorized user. The UGC uploader includes an interface that utilizes the computing device for capturing an image, recording a video, recording an audio, and receiving text inputs. Typically, the UGC uploader integrates with a computing device of the pre-authorized user. In an embodiment, the UGC uploader is configured to access the user-generated content stored in the computing device to upload the user-generated content for the customer.

In an embodiment, the specialized computer system is configured to select the pre-authorized user for sending the UGC uploader based on a user selection parameter. The user selection parameter is at least one of a profile of the pre-authorized user, a rating of the pre-authorized user and social network activity of the pre-authorized user.

In an embodiment, the UGC uploader is one of a mobile application, a desktop application, and a wearable computer application. Typically, the UGC uploader is customized for the customer and is limited to upload the user-generated content for the customer. In an embodiment, the UGC uploader is deactivated after uploading the user-generated content such that the UGC uploader is not available for subsequent use of the pre-authorized user.

In an embodiment, the SCMS includes a search interface enabling the customer to search for user-generated content in the cloud-based social media content repository.

In an embodiment, the specialized computer system is configured to organize the user-generated contents based on classification parameters specified by the customer. Typically, a classification parameter includes at least one of the user-generated content, a consumer brand, a social media campaign, a geographic location, demography, the social media campaign schedule, and the social media network.

In an embodiment, a method for managing content in one or more social media networks using a Social Media Content Management System (SCMS) is disclosed. The SCMS being operatively connected to the one or more social media networks through a communication network. The method includes, at the SCMS using a specialized computer system, generating a user-generated content (UGC) uploader for a pre-authorized user. The pre-authorized user utilizes the UGC uploader to send a user-generated content for a customer. The pre-authorized user has an established trust relation with the customer such that the pre-authorized user is allowed to send the user-generated content for the customer. The user-generated content has been encoded such that it can be uniquely identified with the customer. The method includes, using the specialized computer system, sending the UGC uploader to the pre-authorized user, and receiving the user-generated content from the pre-authorized user. The user-generated content is send by utilizing the UGC uploader. The method further includes, associating the user-generated content with the customer, comparing the user-generated content with a required specification of the user-generated content, and associating metadata with the user-generated content.

In an embodiment, the method includes, storing the user-generated content in a cloud-based social media content repository. The cloud-based social media content repository is coupled with the specialized computer system. The cloud-based social media content repository provides an interface with a digital media library. The interface with the digital media library enables the customer to access a third party content from the digital media library. Typically, the method includes, providing access to the user-generated content stored in the cloud-based social media content repository to the customer and using the specialized computer system, utilizing at least one of the user-generated content and the third party content in a social media campaign of the customer. The method also includes storing information about the social media campaign of the customer in the cloud-based social media content repository.

In an embodiment, the method for managing content across one or more social media networks, further includes accessing social media campaign tools, creating the social media campaign, selecting a social media network for launching the social media campaign, launching the social media campaign, modifying the social media campaign, managing the social media campaign, and terminating the social media campaign.

In an embodiment, a non-transitory computer-readable storage medium is provided. The non-transitory computer-readable storage medium has stored thereon instructions that are executed by a processor cause the processor to perform operations comprising generating a UGC uploader for a pre-authorized user. The pre-authorized user utilizes the UGC uploader to send a user-generated content for a customer. The pre-authorized user has an established trust relation with the customer such that the pre-authorized user is allowed to send the user-generated content for the customer. Further, the user-generated content has been encoded such that it can be uniquely identified with the customer.

The operations performed by the processor include sending the UGC uploader to the pre-authorized user and receiving the user-generated content from the pre-authorized user. The user-generated content is send by utilizing the UGC uploader. The operations performed by the processor further comprising, associating the user-generated content with the customer, comparing the user-generated content with a required specification of the user-generated content, associating metadata with the user-generated content, storing the user-generated content in a cloud-based social media content repository. The cloud-based social media content repository is coupled with the specialized computer system. The cloud-based social media content repository provides an interface with a digital media library. The interface enables the customer to access third party content from the digital media library.

In an embodiment, the operations performed by the processor further comprising, providing access to the user-generated content stored in the cloud-based social media content repository to the customer and using at least one of the user-generated content and the third party content, in a social media campaign of the customer.

In an embodiment, the computer readable storage media further has instructions which when executed by the processor cause the processor to perform operations comprising accessing social media campaign tools, creating the social media campaign, selecting a social media network for launching the social media campaign, launching the social media campaign, modifying the social media campaign, managing the social media campaign, and terminating the social media campaign.

In an embodiment, a non-transitory computer-readable storage medium storing instructions for providing a user-generated content UGC uploader is disclosed. The instructions when executed by a processor cause the processor to perform operations comprising determining a required specification of a user-generated content. The required specification of the user-generated content is at least one of a required format of the user-generated content, a required content of the user-generated content, and a predefined set of rules for the user-generated content. The operations further include encoding the user-generated content to uniquely identify the user-generated content with a customer. The customer is associated with a social media content management system (SCMS). The pre-authorized user has an established trust relationship with the customer such that the pre-authorized user is allowed to send the user-generated content for the customer. The operations further include saving the user-generated content in a UGC database associated with the pre-authorized user, and sending the user-generated content to the SCMS.

In an embodiment, the computer readable storage media further includes instructions which when executed by the processor cause the processor to perform operations that utilizes a computing device of the pre-authorized user for capturing an image, recording a video, recording an audio, and receiving text inputs.

In an embodiment, the operations further include enabling the pre-authorized user to edit the user-generated content prior to sending the user-generated content to the SCMS. In an embodiment, the operations include selecting a compression parameter for the user-generated content, and compressing the user-generated content using the selected compression parameter prior to sending the user-generated content to the SCMS.

While various embodiments are disclosed, still variations of the embodiments of the present invention will become apparent to those skilled in the art from the following detailed description, which describes illustrative embodiments of the invention, or may be learned by practicing the invention as set forth hereinafter. As will be realized, the invention is capable of modifications in various aspects, all without departing from the scope of the present invention. Accordingly, the drawings and detailed description of the present invention are to be regarded as illustrative in nature and not restrictive.

Certain portions of this application, such as the Abstract and Summary, are provided to allow the reader to quickly ascertain the nature of the disclosure. They are submitted with the understanding that they will not be used to interpret or limit the scope or meaning of the claim.

FIG. 1 is example block diagram that illustrates an exemplary environment 100 where various embodiments of the present invention may be practiced. The environment 100 includes a communication network 102. The communication network 102 may be geographically spread over an area, such as a building, a campus, a city, and so forth. Examples of the communication network 102 include a Local Area Network (LAN), a Metropolitan Area Network (MAN), a Wide Area Network (WAN) such as the Internet, and so forth. In any case, the communication network 102 can be a client-server network or a peer-to-peer network.

The environment 100 also includes a Social Media Content Management System (SCMS) 104 coupled with the communication network 102. The SCMS 104 manages user-generated content across one or more social media networks.

The SCMS 104 includes a specialized computer system 106 for social media content management. Typically, the specialized computer system 106 is coupled with the communication network 102. The specialized computer system 106 is also coupled with a database, such as cloud-based social media content repository 108. The SCMS 104 is also coupled with a Digital Media Library 110. The Digital Media Library 110 provides access to third party content. Typically, the digital media library 110 provides content that can be procured by making a payment for the content.

In an embodiment, the specialized computer system 106 is configured for associating the user-generated content with the customer 112, comparing the user-generated content with a required specification of the user-generated content, and associating metadata with the user-generated content. The specialized computer system 106 is also configured for using the user-generated content in a social media campaign of the customer 112. Typically, the specialized computer system 106 generates the UGC uploader for the pre-authorized user.

Typically, a social media campaign is a marketing campaign that runs on one or more social media networks. The social media campaign may include messages, advertisements, notifications, promotional information, public service announcements, news, event announcements etc. published on one or more social media networks. These social media campaign may include a series or grouping of advertisements or messages relating to a particular corporation, product, or theme. For example, a social media campaign may relate to a corporation, such as Apple® and provide details of its existing and upcoming products. A social media campaign may also relate to a theme, such as a series of advertisements or messages around a certain time of the year (e.g. fall, holiday, summer), certain dates (e.g. Halloween, Christmas, Father's day, Independence Day), or certain subject (e.g. baseball season, football season, back to school) and so forth.

The communication network 102 has one or more of customers associated with it. For example, the communication network 102 is associated with customer 112. Typically, the customer is an individual, such as an authorized representative of a corporation, who wishes to utilize the SCMS 104 to manage content, such as user-generated content across one or more social media networks. Typically, the customer is a marketing professional. Typically, the customer refers to an individual or a group of individuals having access privileges to create a marketing program, such as a social media campaign. An example of the customer is an employee of a corporation, such as an employee within the marketing department of the corporation. The customer may be an independent contractor or an employee or a marketing firm hired by the corporation. Moreover, multiple customers may work on the same social media campaign or on different social media campaigns. The term marketing professional and customer is used interchangeably in this document.

Typically, the customer 112 accesses the SCMS 104 through the communication network 102 to manage content, such as user-generated content in one or more social media networks. The customer 112 interacts with the SCMS 104 using one or more computing devices, such as a computing device 114. Examples of the computing device 114 include, but are not limited to, cell phones, PDAs, desktops, laptops, tablets, cameras, smart watches, smart glasses, wearable computing devices, and notebooks.

The customer 112 has a plurality of pre-authorized users associated with it. For example, the customer 112 is associated with pre-authorized users 118, 120, 122, 124 and 126. The pre-authorized user, for example, the pre-authorized user 118 has an established trust relation with the customer 112 such that the pre-authorized user 118 is allowed to send the user-generated content for the customer 112. As referred to herein, a "pre-authorized user" represents a user that creates user-generated content that can be used by customer in his social media campaign. User-generated content is also known as consumer-generated media and is typically content created and uploaded to the Internet by a non-media professional, for example, a professional quality video uploaded on YouTube®, a product feedback left on Amazon® website or a message published on a Facebook® page etc. Typically, the pre-authorized user is registered with the SCMS 104 and has an account with the SCMS 104.

In an embodiment, the pre-authorized user, for example pre-authorized user 118 utilizes a UGC uploader to send user-generated content for the customer 112. The pre-authorized user 118 has an established trust relation with the customer 112 such that the pre-authorized user 118 is allowed to send the user-generated content for the customer 112. Typically, the specialized computer system 106 is configured to receive user-generated content from a pre-authorized user 118. In an embodiment, the user-generated content is encoded such that it can be uniquely identified with the customer 112.

In an embodiment, the pre-authorized user interacts with the SCMS 104 using one or more computing devices. For example, the pre-authorized user 118 uses a computing device 128, the pre-authorized user 120 uses a computing device 130, the pre-authorized user 122 uses a computing device 132, the pre-authorized user 124 uses a computing device 134, and the pre-authorized user 126 uses a computing device 136. Examples of the computing device include, but are not limited to, to, cell phones, PDAs, desktops, laptops, tablets, cameras, smart watches, smart glasses, notebooks and wearable computing devices. For example, the computing device 128 is shown to be a smart glass, such as Google Glass®; the computing device 130 is shown to be a smartwatch, such as a Samsung Galaxy Gear®; the computing device 132 is shown to be a tablet computer, such as an iPad®; the computing device 134 is shown to be a desktop computer; and the computing device 136 is shown to be a laptop computer.

In an embodiment, one or more pre-authorized users may develop user-generated content that may be used for the same social media campaign or for different social media campaigns of the customer 112. The number of pre-authorized users for a social media campaign may vary considerably from time to time depending on a number of factors such as number of active social media campaigns, publishing pattern and other requirements of the customer 112. Typically the customer 112 selects one or more pre-authorized used for the social media campaign.

The SCMS 104 is operatively connected to one or more social media networks, such as social media network 138, through the communication network 102. The social media network 138 includes an application-programming interface (API) 140 and a plurality of members, such as member 142, member 144 and member 146. Each member can access the social media network 138 through the communication network 102 by using a computing device. Typically, a member of the social media system, such as member 142 is the target audience for the user-generated content published by the customer 112 on the social media network 138.

The API 140 enables the SCMS 104 to interact with the social media network 138. Typically, the API 140 enables the SCMS 104 to publish user-generated content, such as, messages, images, texts, videos etc. on a social media campaign running on the social media network 138. The API 140 also enables, scheduling the user-generated content delivery to the social media network 138. Typically, each social media network has its own API that enables the customer 112 to manage user-generated content of his social media campaign on the social media network.

The cloud-based social media content repository 108 is configured to store the user-generated content. In an embodiment, the cloud-based social media content repository 108 provides a UGC interface to access the user-generated content. Typically, the UGC interface provides a search interface enabling the customer 112 to search for the user-generated content. The user-generated content is to be used in the social media campaign of the customer 112. The cloud-based social media content repository 108 also provides an interface with a digital media library 110. The interface enables the customer to access third party content from the digital media library 110. The third party content may be used in the social media campaign of the customer.

In an embodiment, the cloud-based social media content repository 108 stores information about one or more customers associated with the SCMS, social media campaigns, published and unpublished content, user-generated content received from pre-authorized users, metadata associated with the user-generated content, profile information of customers and pre-authorized users, information about social media campaigns and so forth.

In an embodiment, the customer 112 decides to create a social media campaign. Typically, the customer 112 uses the SCMS 104 to generate a UGC uploader. In an embodiment, the SCMS 104 determines the uploader preference for generating the UGC uploader. Typically, the SCMS 104 receives the uploader preference from the customer 112. In another embodiment, the SCMS 104 receives the uploader preference from the pre-authorized user.

Typically, the UGC uploader for the customer 112 is based on uploader preference provided by the customer 112. For example, the customer 112 may specify the uploader preference for a UGC uploader such that the UGC uploader may work on an iPhone® of the pre-authorized user. In this example, the specialized computer system 106 will generate a UGC uploader that can be used on an iPhone® of the pre-authorized user. In an embodiment, the pre-authorized user, for example, pre-authorized user 118 may provide his uploader preference to the SCMS 104. For example, the pre-authorized user 118 may specify that it would require a UGC uploader that can work with a SmartGlass, such as GoogleGlass®. Typically, the uploader preference may specify a plurality of computing devices.

Typically, the uploader preference specifies one or more functionalities of the UGC uploader. A functionality of the UGC uploader is at least one of capturing an image, recording a video, recording an audio, and receiving text input. Typically, the uploader preference is specific to a computing device. For example, the specialized computer system 106 may generate a UGC uploader specific to one of: a smartphone, a tablet computer, a laptop, a smart watch, a smart glass, a PDA, or a desktop based on the uploader preference. In an embodiment, the customer 112 provided the uploader preference. In another embodiment, the pre-authorized provides the uploader preference. In yet another embodiment, the SCMS 104 determines the uploader preference.

In an embodiment, the customer 112 specifies a plurality of user to send the UGC uploader. For example, the customer 112 may specify that the UGC uploader should be sent to the pre-authorized user 118, the pre-authorized user 120, and the pre-authorized user 122. Typically, the SCMS 104 will create a UGC uploader specific to the computing device of the pre-authorized user. In an embodiment, the SCMS 104 has details of the computing device of the pre-authorized user based on the information provided by the pre-authorized user.

Once a pre-authorized user receives the UGC uploader, it may decide to create user-generated content for the social media campaign. For example, the pre-authorized user 118 may take a video using the computing device 128, the pre-authorized user 120 may take a photo using the computing device 130 and the pre-authorized user 122 may create a write-up using the computing device 132. Thereafter, each of the pre-authorized users 118, 120, and 122 may send the user-generated content (the video, the photo, and the write-up) to the SCMS 104 for the customer 112. Typically, each of the pre-authorized users will upload the user-generated content using the UGC uploader. In an embodiment, the received user-generated content at the SCMS 104 is stored in the cloud-based social media content repository 108.

Thereafter, the customer 112 may access the user-generated content from the cloud-based social media content repository 108 and create the social media campaign using one or more user-generated contents from the received user-generated contents. In an embodiment, the customer 112 may use the received user-generated content in his existing social media campaign.

In an embodiment, the customer 112 will then access the social media network 138 and publish messages/posts relevant to the social media campaign on the social media network 138. In an embodiment, the message/posts of the customer 112 include the user-generated content received by the SCMS 104. The user-generated content may include content, such as text, audio, video, image and so forth. Typically, the user-generated content includes identity of the pre-authorized user. In an embodiment, the user-generated content may be published on behalf of the pre-authorized user such it appears to other members of the social media network that the user-generated content is published by the pre-authorized user.

In an embodiment, members of the social media network 138, for example the member 142, may reply by posting a message, post comments, share the message/post posted by the customer 112 with other members of the social media network, send messages back to the customer 112, etc. Other members, for example, member 144 may respond to the message of the member 142 by posting messages and thus an interaction of members of the social media network 138 starts and the social media campaign of the customer 112 progresses. Typically, the purpose of the social media campaign is to create awareness and interest of the members of the social media network 138. In an embodiment, the customer 112 may run a plurality of social media campaigns across one or more social media networks using the SCMS 104.

Figure 2:
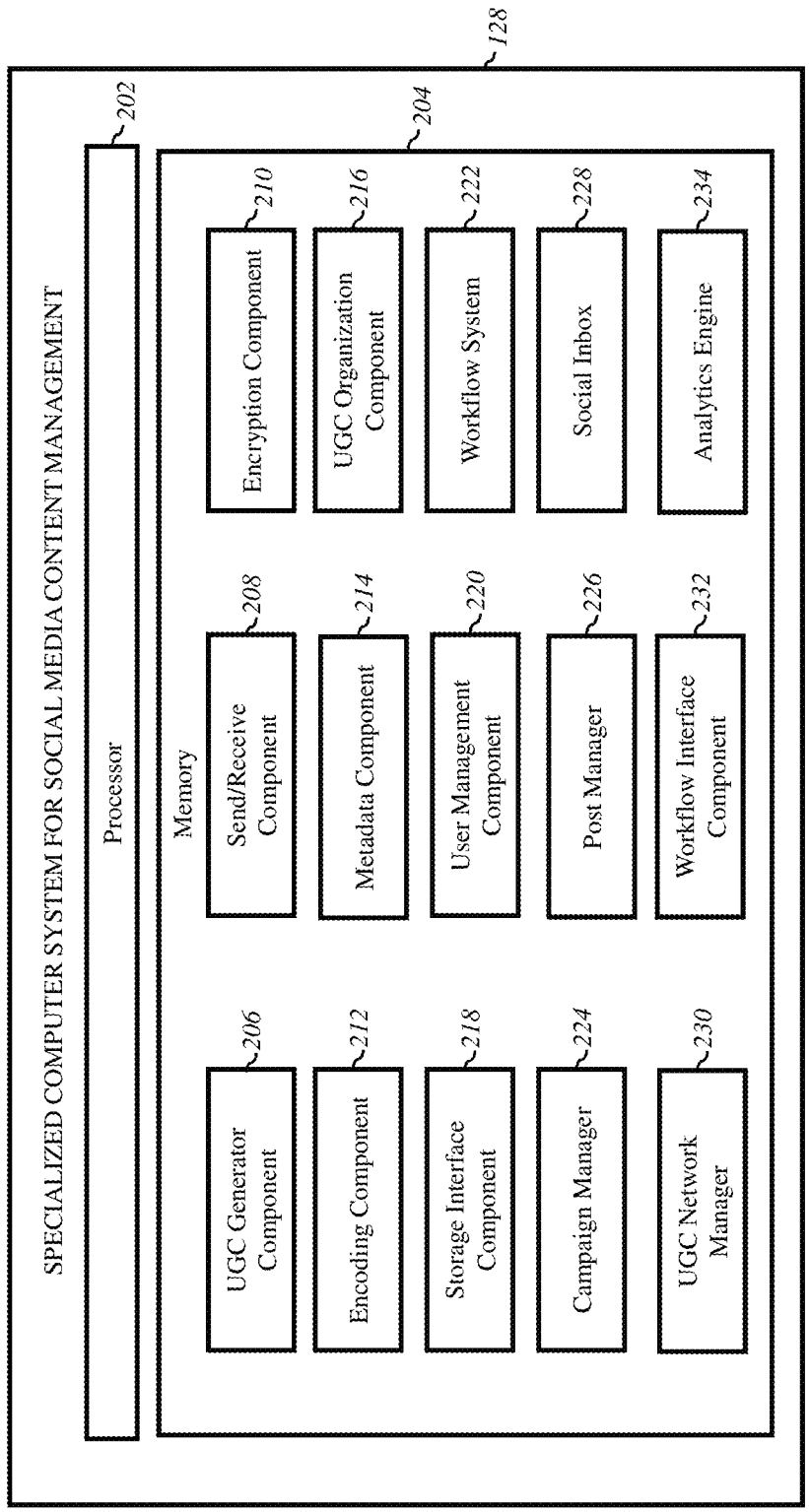
FIG. 2 is an example block diagram illustrating a specialized computer system 106 for social media content management in accordance with an embodiment of the present invention.

FIG. 2 is an example block diagram illustrating the specialized computer system 106 in accordance with an embodiment of the invention. The specialized computer system 106 includes a processor 202 and a memory 204 coupled with the processor 202. The memory 204 includes instructions when executed by the processor 202 causes the processor 202 to perform operations for social media content management in accordance with various embodiments of the present invention.

The memory 204 includes the UGC generator component 206, a Send/Receive component 208, an encryption component 210, an encoding component 212, a metadata component 214, a UGC organization component 216, a storage interface component 218, a user management component 220, a workflow system 222, a Campaign Manager 224, a Post Manager 226, a Social Inbox 228, a UGC Network Manager 230, a Workflow Interface Component 232, and an Analytics Engine 234.

The UGC generator component 206 generates the UGC uploader. Typically, the specialized computer system 128 generates the UGC uploader for a pre-authorized user, for example, for the pre-authorized user 128. In an embodiment, the UGC uploader is generated based on details specified by the customer 112. The UGC uploader enables the pre-authorized user to upload user-generated content for the customer. Typically, the UGC uploader includes instructions for encoding the user-generating component to uniquely identify the user-generated content with the customer.

Typically, the UGC uploader for the customer 112 is based on uploader preference specified by the customer 112. For example, the customer 112 may specify a UGC uploader for iPhone®. In this example, the specialized computer system 106 will generate a UGC uploader that can be used by pre-authorized users having an iPhone®. In an embodiment, the uploader preferences are specific to a computing device. For example, the specialized computer system 106 may generate a UGC uploader specific to one of: a smartphone, a tablet computer, a laptop, a smart watch, a smart glass, a PDA, or a desktop. In an embodiment, the SCMS 104 may provide a user-interface to the customer 112 to specify the uploader preference. In an embodiment, the pre-authorized user may specify his uploader preference.

In an embodiment, the specialized computer system 106 is configured to include a required specification of the user-generated content in the UGC uploader so that the required specification is delivered to the pre-authorized user. Typically, the required specification of the user-generated content includes a required format of the user-generated content, a required content of the user-generated content, and a predefined set of rules for the user-generated content. Typically, the required format of the user-generated content includes at least one of a text format, an image format, a video format, an audio format, and a custom format. Typically, a custom format is a combination of one or more formats.

In an embodiment, the UGC uploader uploads or sends the user-generated content for the customer when the user-generated content meets the required specification. Typically, the customer 112 provides the required specification.

The required format of the user-generated content is, for example, a Joint Photographic Experts Group (JPEG) format, a Tagged Image File Format (TIFF), a Bitmap Image File (BMP) format, and a Graphics Interchange Format (GIF) when the user-generated content is an image. In another embodiment, the required format may be specific to the computing device of the pre-authorized user. In this embodiment, the required format may specify that the user-generated content should be in a format specific to the computing device, for example a format specific to a Smart-Watch or a SmartGlass.

The required content of the user-generated content is, for example, a consumer brand name that is to be included in the user-generated content. In this example, the marketing manager planning a social media campaign for a Starbucks® coffee may require that the pre-authorized users include the name, image or video of Starbucks® in the user-generated content. Accordingly, a pre-authorized user may be required to include the name "Starbucks®" if the user-generated content is in text format, another pre-authorized user may be required to include the Starbucks® logo if his user-generated content is an image. The required content of the user-generated content may provide instructions for the user-generated content. For example, the customer 112 may include and instruction that the required content must be 'experience with GoogleGlass®.' In this example the pre-authorized users are expected to share their experience with GoogleGlass®. Accordingly, the pre-authorized user could share a video captured using GoogleGlass®, or a text write-up about his experience with GoogleGlass®.

In an embodiment, the predefined set of rules for the user-generated content includes standard rules and policies specific to the social media network. For example, some social media network may impose a character limit on a message text, while other may not allow any multimedia content. To ensure that the user-generated content complies with the social media network these predefined set of rules for the user-generated content may be included in the required specification of the user-generated content. In an embodiment, the customer 112 provides the predefined set of rules for the user-generated content. In an embodiment, the set of rules may prohibit use of undesirable content such as, abusive words, competitor names, rival products, racist language, and sexist terms. The set of rules may also prohibit links, images, videos, audio or any such content deemed undesirable.

In an embodiment, the UGC uploader is a mobile application. In another embodiment the UGC uploader is a desktop application. In yet another embodiment, the UGC uploader is a wearable computer application. A wearable computer application is an application that can run on a wearable computing device, for example, on a Smartwatch, or a Smartglass.

Once the UGC uploader is generated, the SCMS 106 sends it to the pre-authorized user using the Send/Receive component 208. In an embodiment, the customer specifies the pre-authorized users for sending the UGC uploader. In another embodiment, the UGC uploader is sent to all the pre-authorized users associated with the customer 112. The send/receive component 208 also receives the user-generated content uploaded by the pre-authorized user. Typically, the pre-authorized user sends or uploads the user-generated content utilizing the UGC uploader.

The Encoding component 212 includes instructions for encoding the user-generated content and decoding the user-generated content received by the SCMS 104. In an embodiment, the instructions for encoding the user-generated content includes instructions for encoding the user-generated content using a key. Typically, the key indicates that the user-generated content is encoded for the customer, for example the customer 112. In an embodiment, the key indicates that the content is for a social media campaign for the customer 112. In another embodiment, the key may uniquely identify the customer 112. Typically, the key is a unique identifier of the user-generated content and the pre-authorized user. In an embodiment, the user-generated component is encrypted using the key.

The Metadata component 214 includes instructions for specifying metadata that is to be associated with the user-generated content. Typically, the customer specifies the metadata to be associated with the user-generated content. In an embodiment, the customer associates metadata by providing values for fields associated with the user-generated content. Examples of fields include, title, description, type, and tags for the user-generated content. Tags are one or more keywords describing the user-generated content.

In an embodiment, the metadata is based on at least one of the pre-authorized user, the customer, the user-generated content, a consumer brand associated with the user-generated content, purpose of the user-generated content, time of creation of the user-generated content, author of the user-generated content, software environment of creation of the user-generated content, hardware environment of creation of user-generated content, and a standard associated with the user-generated content. Typically, the software environment provides details of, for example, the operating system, or a software application running on the computing device used by the pre-authorized user to create the user-generated content. Examples of the software environment include iOS®, Android Operating system, Adobe Photoshop® and so forth. Similarly, the hardware environment includes for example, the hardware used by the pre-authorized user. Examples of the hardware include but are not limited to iPhone®, iPad®, Samsung Galaxy Tab®, Google Glass® and so forth.

The UGC Organization Component 216 organizes the user-generated content. Typically, the user-generated content is organized according to parameters defined by the customer 112. Examples of the parameters include, but are not limited to, content type, pre-authorized user, tags, metadata, consumer brand, time of creation of the user-generation content, content of the user-generated content, a social media network, and the social media campaign.

The storage interface component 218 provides a UGC search interface and an interface for a digital media library. The UGC search interface enables the customer 112 to search for user-generated content in the cloud-based social media content repository 108. The interface for the digital media library enables the customer to access third party content from the digital media library 110. In an embodiment, the user-generated content received by the SCMS 104 and the content procured from the digital media library 110 are stored in the cloud-based social media content repository 108.

The User Management Component 220 manages the pre-authorized users associated with the SCMS 104. In an embodiment, the user management component 222 has profile details of the pre-authorized user. Examples of the profile details include but are not limited to, name, age, sex, language proficiency, computing device used by the pre-authorized user, geographic location, country, and social media membership of the pre-authorized user.

In an embodiment, the user management component 222 includes performance details of the pre-authorized users. The performance details include, but are not limited to, the quality of the user-generated content send by the user, the popularity of the use-generated content of the pre-authorized user on one or more social media network, the response time of the pre-authorized user in sending the user-generated content. The user management component 222 also includes a user-rating module that provides rating of the pre-authorized user based on the predefined parameters. In an embodiment, the user management component 220 provides a user search component which enable the customer 112 to search for a pre-authorized user based on search criteria such as profile detail, rating etc.

The Workflow System 222 enables performing a sequence of operations on the user-generated content for using the user-generated content in the social media campaign of the customer. In an embodiment, the sequence of operations include at least one of editing the user-generated content, adding content to the user-generated content, removing content from the user-generated content, approving the user-generated content, modifying metadata associated with the user-generated content, modifying the user-generated content to conform with a social media network, and modifying the user-generated content based on requirements of the communication network 102. Typically, the workflow system enables various stakeholders, such as marketing professionals, marketing managers, design engineers, strategists, legal professionals, to collaborate, share and work together on a social media campaign or on a user-generated content.

The Campaign Manager 224 enables managing the social media campaign. The campaign manager 224 provides an interface for accessing social media campaign tools, creating the social media campaign, selecting a social media network for launching the social media campaign, launching the social media campaign, modifying the social media campaign, and terminating the social media campaign.

In an embodiment, the campaign manager enables the customer to define parameters for the social media campaign. The parameters for the social media campaign are at least one of launch date of the social media campaign, launch time of the social media campaign, end date of the social media campaign, end time of the social media campaign, a language for the social media campaign, a social media network for the social media campaign, a country for launching the social media campaign, a geographic region for the social media campaign, a target demography for the social media campaign, and rules for participation in the social media campaign.

In an embodiment, the campaign manger 224 enables the customer to moderate the content posted by members of the social media network 138, when the posted content for the social media campaign of the customer. Typically, the customer can view responses to content published on the social media network 138 and filter out undesirable content. Examples of the undesirable content include, abusive words, competitor names, racist language, sexist terms, links, images, videos, audio or any other content deemed undesirable.

In an other embodiment, the campaign manger 224 may also scan content posted by the members of the social media network to find desirable content, such as praise for a customer's product, interest in specific products etc.

The Post Manager 226 provides an interface that enables the customer 112 to publish content, for example user-generated content on the one or more social media networks. Typically, the post manager 226 enables scheduling the delivery of user-generated content on the social media network.

In an embodiment, the Post Manager 226 enables the SCMS to implement the required specification of the user-generated content. In an embodiment, the customer defines the required specification. In another embodiment the social media network defines the required specification. In yet another embodiment, both the customer and the social media network define the required specification. Typically, the required specification ensures that the user-generated content adhere to the rules and policies of the social media network 138 regarding font size, text type, maximum number of characters allowed etc. This enables the customer 112 to check if a user-generated content is compatible with the social media network rather than requiring the customer to remember all such rules of the social media network.

Typically, the Post Manager 226 enables the customer to publish the user-generated content on the social media network 138 when the user-generated content meets the required specification. Typically, the required specification of the user-generated content includes at least one of the required format of the user-generated content, the required content of the user-generated content and the predefined set of rules for the user-generated content.

Each social media network has particular standard set of rules, policies that must be met to publish content on that social media network. For example, Twitter® imposes a limit on the number of characters on Tweets®, while some social media networks do not allow multimedia content. In an embodiment, to ensure that the user-generated content meets the requirement of the social media network the SCMS 104 may enforce the required specifications on the user-generated content. For example, if the required specification prohibits multimedia content, then Post Manager 226 may not allow the customer 112 to publish a user-generated content that includes multimedia content. Alternatively, in this example, the Post Manger 226 may simply remove an embedded multimedia component from the user-generated content before publishing the user-generated content.

The Social Inbox 228 provides a display interface for depicting activities associated with the social media campaign, a filter component for segmenting activities associated with the social media campaign based on at least one filter parameter specified by the customer, and a campaign monitor for monitoring the social media campaign across the one or more social media networks.

The UGC Network Manager 230 is configured to manage a trusted social network of the customer 112. The trusted social network of the customer 112 includes the customer 112 and one or more pre-authorized users. The one or more pre-authorized users have an established trust relation with the customer such that the pre-authorized user is allowed to send the user-generated content for the customer. In an embodiment, the UGC network manager 230 enables the customer to form the trusted social network of the customer 112.

The Workflow Interface Component 232 integrates the SCMS 104 with a third party workflow system. The third party workflow system is at least one of from the group includes a Customer Relation Management (CRM) system, a Supply Chain Management (SCM) system, an Enterprise Resource Planning (ERP) system, a Human Resource Management (HRM) system, and a Marketing Management System (MMS).

The Analytics Engine 234 is configured for generating analytics information about the social media campaigns. The Analytics Engine includes a dashboard for displaying analytics of the social media campaign, and a campaign reporter for providing reports of the social media campaign. The analytics engine 234 performs various analytics functions, generates metrics, and provides reports. Typically, the analytics engine provides reports that may enable the customer to determine the success of the social media campaign, popularity of a particular user-generated content. In an embodiment, the analytics engine 234 may extract messages posted by members of the social media network and store them in the cloud-based social media content repository 108. The analytics engine 234 may also generate reports such as interactive charts and graphs for the customer 112.

Figure 3:
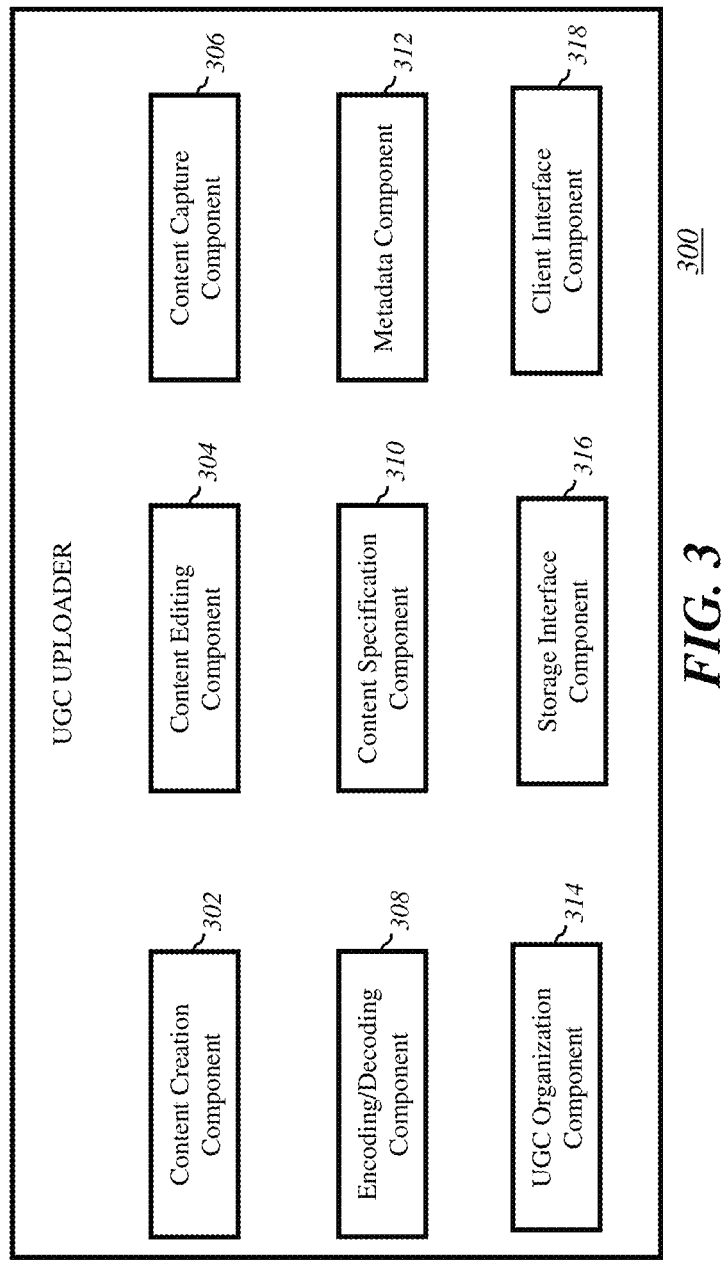
FIG. 3 is an example block diagram illustrating a UGC uploader 300 in accordance with an embodiment of the present invention.

FIG. 3 is an example block diagram illustrating the UGC uploader 300 in accordance with an embodiment of the present invention. The UGC uploader includes an content creation component 302, a content editing component 304, a content capture component 306, an encoding/decoding component 308, a content specification component 310, a metadata component 312, a UGC organization component 314, a storage interface component 316 and client interface component 318.

Typically, the UGC uploader is one of a mobile application, a desktop application, and a wearable computer application. In an embodiment, whether the UGC uploader is a mobile application, a desktop application, or a wearable computer application depends on an uploader preference. Typically, the uploader preference is determined by the SCMS 104.

In an embodiment, the UGC uploader is customized based on the requirement of the pre-authorized user. For example, if the pre-authorized user uses a tablet computer, such as an iPad®, the UGC uploader will be compatible with the iPad®. In this example, the UGC uploader is made available to the pre-authorized user at the App Store® and will have functionality that can be implemented by a pre-authorized user having an iPad®. In various embodiments of the invention, the UGC uploader integrates with the computing device of the pre-authorized user. Typically, the UGC uploader integrates with the hardware and software of the computing device of the pre-authorized user and enables capturing, editing and creation of the user-generated content. Typically the UGC uploader is configured to access the user-generated content stored in the computing device of the pre-authorized user.

In an embodiment, the UGC uploader is customized for the customer and is limited to send or upload the user-generated content for the customer. In other words the pre-authorized user can use the UGC uploader to send the user-generated content only for the customer 112 or for someone authorized by the customer 112. Typically, the UGC uploader is automatically deactivated after uploading the user-generated content such that the UGC uploader is not available for subsequent use of the pre-authorized user. In another embodiment, the UGC uploader is deactivated when the customer terminates the social media campaign.

The content creation component 302 enables the pre-authorized user to create user-generated content for the customer. For example, the content creation component 302 may provide an interface to create textual content. In another example, the content creation component 302 may provide an interface to capture/create an image or an info-graphic.

The content editing component 304 enables the pre-authorized user to edit the user-generated content. For example, the content editing component 304 may enable the pre-authorized user to edit a text file by adding or modifying text file. In another example, the content editing component 304 may provide an interface to edit an image file by implementing one ore more image processing functionality, such as, modifying resolution, cropping, adjusting brightness, contrast, color and so forth.

In an embodiment, the content capture component 306 provides an interface that enables the pre-authorized user to capture content. For example, the content capture component 306 may provide a user interface for recording of an audio and/or a video. Typically, the content capture component 306 integrates with the hardware and software of the computing device of the pre-authorized user. For example, when the pre-authorized user has an iPad® then the content capture component may integrate with the camera of the iPad® and thereby enable the pre-authorized user to capture and image using the camera of the iPad®.

The encoding/decoding component 308 enable the UGC uploader to encode the user-generated content such that the user-generated content can be uniquely identified with the customer. Typically, the user-generated content is encoded using a key. Typically, the key indicates that the user-generated content is encoded for the customer. In an embodiment, the key is a unique identifier for the user-generated content and is used to encrypt the user-generated content. Typically, the key indicates that the user-generated content is encoded for the customer.

The content specification component 310 provides the required specification of the user-generated content. In an embodiment, the UGC uploader uploads or sends the user-generated content for the customer when the user-generated content meets the required specification. In an embodiment, the customer provides the required specification. Typically, the required specification of the user-generated content includes at least one of: the required format of the user-generated content, the required content of the user-generated content and the predefined set of rules for the user-generated content.

Typically, each social media network has particular standard set of rules, policies that must be met to operate on that social media network. For example, Twitter® imposes a limit on the number of characters on Tweets®, while some social media networks do not allow multimedia content. In an embodiment, to ensure that the user-generated content meets the requirement of the social media network the customer may enforce the required specifications on the user-generated content. For example, if the required specification prohibits multimedia content, then the content specification component 310 may not allow the pre-authorized user to upload a user-generated content that includes multimedia content. Alternatively, the content specification component 310 may simply remove an embedded multimedia component from the user-generated content before uploading the user-generated content. In another embodiment, the content specification component 310 may send the user-generated content for the customer without any modification even if the user-generated content does not meet the required specification.

The metadata component 312 is configured to associate metadata with the user-generated content. Typically, the pre-authorized user specifies the metadata to be associated with the user-generated content. In an embodiment, the customer specifies the metadata to be associated with the user-generated content. Typically, the pre-authorized user provides metadata by providing values for fields associated with the user-generated content. Examples of fields include, title, description, type and keywords for the user-generated content. In an embodiment, the UGC uploader automatically associates metadata with the user-generated content.

In an embodiment, the metadata is based on at least one of the pre-authorized user, the customer, the user-generated content, a consumer brand associated with the user-generated content, purpose of the user-generated content, time of creation of the user-generated content, author of the user-generated content, software environment of creation of the user-generated content, hardware environment of creation of user-generated content, and a standard associated with the user-generated content. Examples of the standard include, but are not limited to, an image standard, a compression standard, and an encryption standard.

The UGC organization component 314 enables organizing the user-generated content. Typically, the UGC organization component 314 provides a user interface to enable the pre-authorized user to organize the user-generated content. In an embodiment, the user-generated content is organized according to parameters defined by the pre-authorized user. Examples of the parameters include, but are not limited to, content type, pre-authorized user, tags, metadata, consumer brand, time of creation of the user-generation content, content of the user-generated content, a social media network, and the social media campaign.

The storage interface component 316 provides an interface for accessing content of the pre-authorized user to be sent to the SCMS 104. In an embodiment, the storage interface 316 provides a search interface for a keyword-based search. In another embodiment, the storage interface 316 provides an interface to access the user-generated content in the local storage of the computing device of the pre-authorized user. In yet another embodiment, the storage interface 316 integrates with a remote storage repository, such as iCloud® or Google Drive®, of the pre-authorized user and enables him to access user-generated content from the remote storage repository.

The client interface component 318 provides a UGC uploader interface. Typically, the pre-authorized user, for example the pre-authorized user 118, uses the UGC uploader interface to manage the user-generated content. In an embodiment, the user interface enables the pre-authorized user to utilize the computing device for capturing an image, recording a video, recording an audio, and receiving text inputs. The UGC uploader interface is explained in detail in conjunction with FIG. 4.

Figure 4:
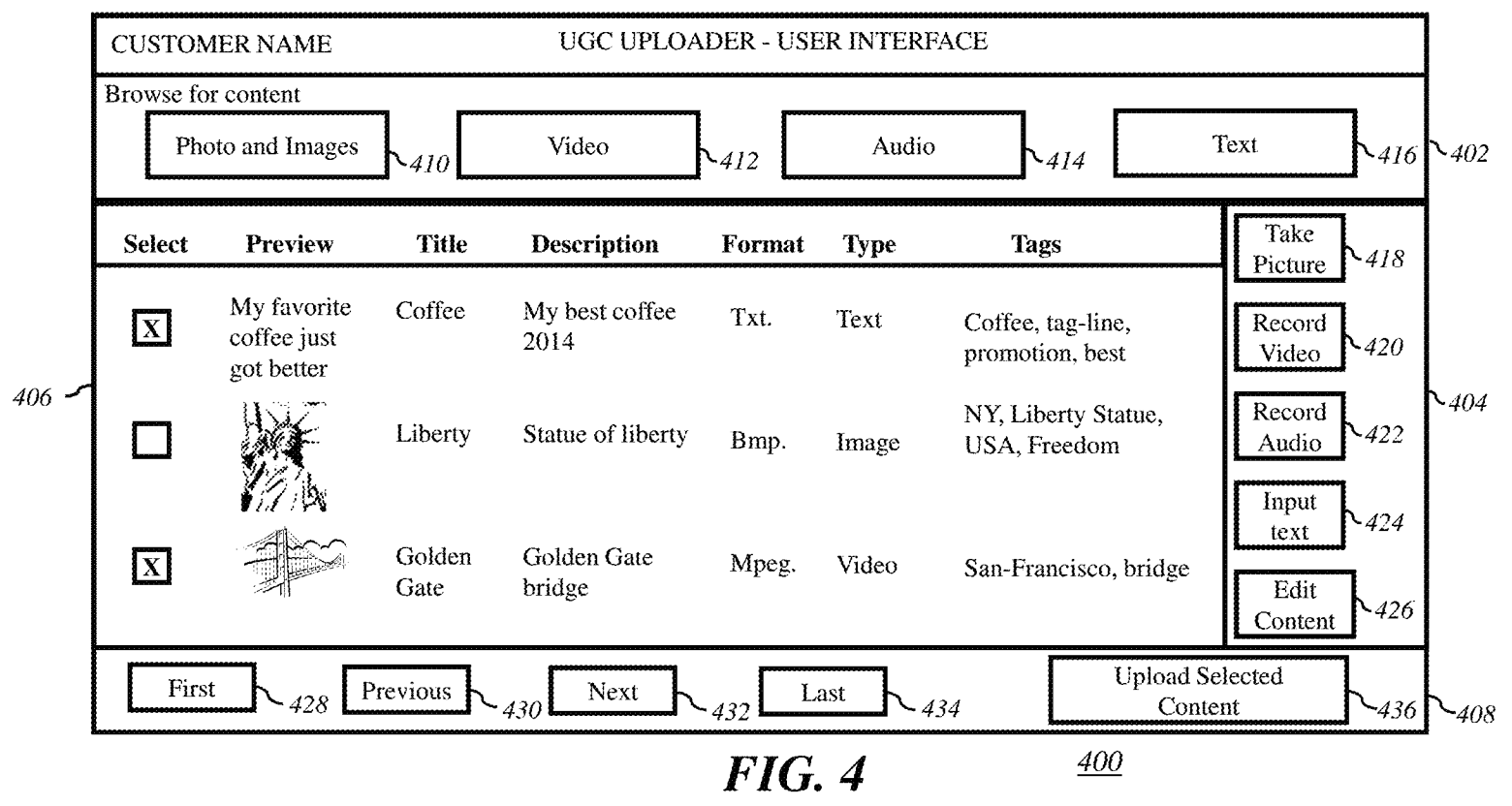

FIG. 4 is a block diagram illustrating the UGC uploader interface 400, in accordance with an embodiment. Typically, the pre-authorized user, for example the pre-authorized user 118, uses the UGC uploader interface 400 to manage the user-generated content. In an embodiment, the UGC uploader interface 400 enables the pre-authorized user to utilize his computing device for capturing an image, recording a video, recording an audio, receiving text inputs and so forth.

In an embodiment, the UGC uploader is based on uploader preference specified by the customer 112. For example, the customer 112 may specify a UGC uploader for iPhone®. In this example, the specialized computer system 106 will generate a UGC uploader that can be used by pre-authorized users having an iPhone®. Typically, the uploader preferences are specific to a computing device. For example, the specialized computer system 106 may generate a UGC uploader specific to a smartphone, a tablet computer, a laptop, a smart watch, a smart glass, a PDA, and a desktop.

In an embodiment, the uploader preference specifies the functionality available at the UGC uploader. For example, the uploader preference may provide that the UGC uploader should enable the pre-authorized user to only upload text. In another embodiment, the uploader preference may provide that the UGC uploader should enable the pre-authorized user to upload text and/or audio but no images or video. In yet, another embodiment, the UGC uploader may enable the pre-authorized user to take picture and input text but does not allow recording audio. A person skilled in the art will understand that one or more functionality may be available in the UGC uploader based on the uploader preference. Typically, the customer 112 provides the uploader preference to the SCMS 104. In another embodiment, the SCMS 104 may provide one or more functionality in the UGC uploader based on the computing device used by the pre-authorized user. In an embodiment, the SCMS 104 provides a user interface for providing the uploader preference.

The UGC uploader interface 400 is shown to include a browse section 402, the content capture section 404, content display section 406, and a tools section 408.

In an embodiment, the content section 402 enables the pre-authorized user to locate content stored in the computing device of the pre-authorized user. Typically, the content section 402 includes the Photo and images button 410, Video button 412, Audio button 414, and Text button 416. The Photo and images button 410 is used to locate photo files or images files in the computing device, the Video button 412 is used to locate video files in the computing device, the Audio button 414 is used to locate audio files in the computing device, and the text button 416 is used to locate text files in the computing device.

The content capture section 404 includes a take picture button 418, a record video button 420, a record audio button 422, an input text button 424 and an edit content button 426. The take picture button 418 enables the pre-authorized user to take a photograph by utilizing a camera of the computing device of the pre-authorized user. The record video button 420 enables the pre-authorized user to record a video by utilizing the camera of the computing device of the pre-authorized user. The record audio button 422 enables the pre-authorized user to record and audio by utilizing the voice record functionality of the computing device of the pre-authorized user. The Input text button 424 enables the pre-authorized user to input text and thereby create a user-generated content. The edit content button 426 enables the pre-authorized user to edit user-generated content, such as text, audio, video, or image.

The content display section 406 displays the user-generated content stored in a UGC database of the pre-authorized user. Examples of the UGC database include, a database residing in the memory of the computing device of the pre-authorized user, a remote database, such as iCloud® repository associated with the pre-authorized user and so forth. Typically, content display section 406 provides a preview of the user-generated content available for the pre-authorized user and displays values associated with fields such as, title, description, format, type, and tags etc. The content display section 406 also provide a select field which enables the pre-authorized user to select a content for upload to the to SCMS 104. In an embodiment, the content display section 406 displays the metadata associated with the user-generated content.

The tools section 408 provides a first button 428, previous button 430, a next button 432, and a last button 434 and an upload selected content 436. The buttons 428 to 434 enable the pre-authorized user to scroll through the user-generated contents in the content display section 406. The Upload selected content button 436 enables the pre-authorized user to upload or send the selected user-generated content for the customer 112.

Figure 5:
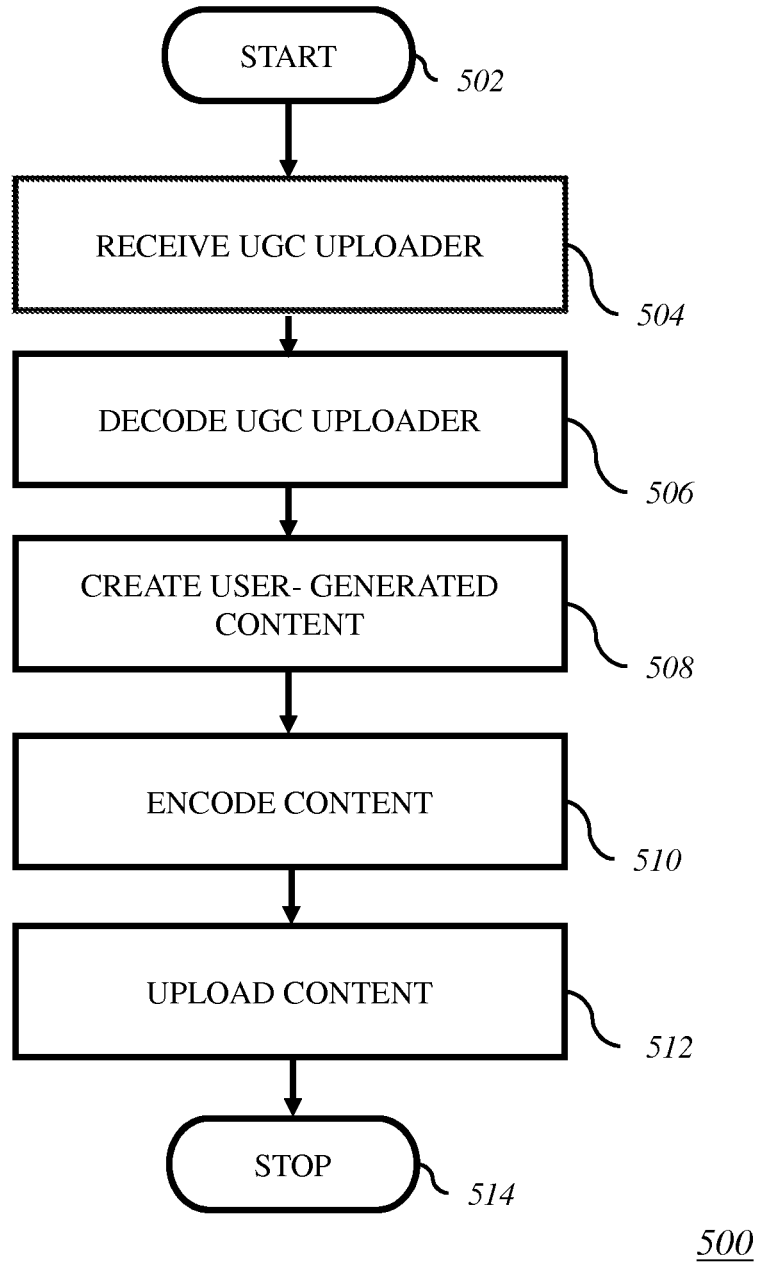
FIG. 5 is a flow diagram illustrating a method 500 for managing user-generated content, using a UGC uploader in accordance with an embodiment of the present invention.

FIG. 5 is a flow diagram illustrating the method 500 for managing user-generated content, using a UGC uploader in accordance with an embodiment of the present invention. To describe the method 500, reference has been made to FIG. 1, FIG. 2 and FIG. 3, although it should be understood that the method 500 could be implemented in any other suitable environment or communication network. Moreover, the invention is not limited to the order in which the steps are listed in the method 500. In an embodiment, the method 500 is performed at the computing device of the pre-authorized user.

At step 502 the method for managing user-generated content, using a UGC uploader is initiated. At step 504, the pre-authorized user receives a UGC uploader. In an embodiment, the pre-authorized user receives information from the SCMS 104 that the UGC uploader is available for the pre-authorized user. For example, the pre-authorized user may receive information that the UGC uploader is available for download at a location, such as an AppStore®. In this example, to receive the UGC uploader the pre-authorized user may download the UGC uploader from the AppStore®. In an embodiment, the SCMS may provide an authentication key to download the UGC uploader. In another embodiment, the UGC uploader may be available for any user to download, but could only be used by the pre-authorized user after applying an activation key. Typically the activation key is provided by the SCMS 104. In an embodiment, the SCMS may enable the customer 112 to generate the activation key. In this embodiment, the customer 112 sends the activation key to the pre-authorized user.

At step 506, UGC uploader is decoded. Typically, the decoding of the UGC uploader is performed to determine the required specification of the user-generated content. The required specification of the user-generated content includes at least one of from the group includes the required format of the user-generated content, the required content of the user-generated content, and the predefined set of rules for the user-generated content.

At step 508, the pre-authorized user creates the user-generated content for the customer. In an embodiment, the pre-authorized user captures the user-generated content, for example an image, an audio or a video. In another embodiment, the pre-authorized user selects a user-generated content stored in the computing device of the pre-authorized user. Typically, the pre-authorized may also edit the user-generated content.

In an embodiment, the pre-authorized user associates metadata to the user-generated content. In another embodiment, metadata is automatically associated with the user-generated content based on the parameters specified by the customer. Typically, the user-generated content is saved in a UGC database associated with the pre-authorized user. Examples of the UGC database include, a database residing in the memory of the computing device of the pre-authorized user, a remote database, such as iCloud® associated with the pre-authorized user and so forth.

At step 510, the user-generated content is encoded so that the user-generated content can be uniquely identified with the customer. Typically, the user-generated content is encoded using a key, wherein the key indicates that the user-generated content is encoded for the customer. In an embodiment, the key is a unique identifier for the user-generated content and is used to encrypt the user-generated content.

At step 512, the user-generate content is sent to the SCMS 104 for the customer. In an embodiment the user-generated content is send to the SCMS 104 when it meets the required specification. Typically, the user-generated content is compressed based on a compression parameter. In an embodiment, the customer specifies the compression parameter. Thereafter, the method 500 terminates at step 514.

Figure 6:
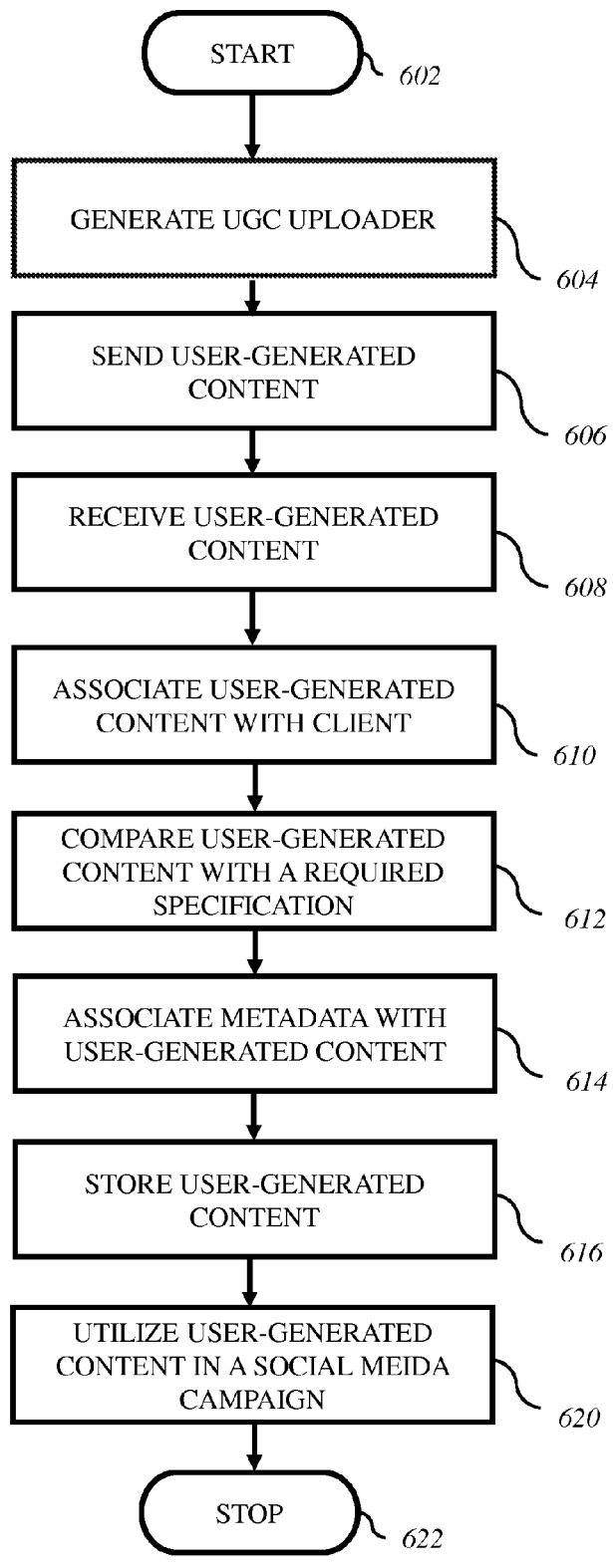
FIG. 6 is a flow diagram illustrating a method 600 for managing user-generated content by social media content management system (SCMS) (104) a in accordance with an embodiment of the present invention.

FIG. 6 is a flow diagram illustrating the method 600 for managing user-generated content by the SCMS 104 in accordance with an embodiment of the present invention. To describe the method 600, reference has been made to FIG. 1, FIG. 2 and FIG. 3, although it should be understood that the method 600 could be implemented in any other suitable environment or communication network. Moreover, the invention is not limited to the order in which the steps are listed in the method 600. In an embodiment, the method 600 is performed at the SCMS 104. Typically, the method steps are performed by the specialized computer system 106.

At step 602, the method for managing user-generated content in one or more social media networks using the SCMS 104 is initiated. At step 604, the SCMS 104 generates the UGC uploader. In another embodiment, the SCMS 104 configures the UGC uploader based on an uploader preference provided by the customer 112. Typically, the UGC uploader is generated based on the uploader preference provided by the customer 112. The pre-authorized user utilizes the UGC uploader to send a user-generated content for the customer. The pre-authorized user has an established trust relation with the customer such that the pre-authorized user is allowed to send the user-generated content for the customer. Typically, the user-generated content is encoded such that it can be uniquely identified with the customer.

At step 606, the SCMS 104 sends the UGC uploader to the pre-authorized user, for example, to the pre-authorized user 120. Typically, the customer 112 selects the pre-authorized user to send the UGC uploader. In an embodiment, a pre-authorized user may send a request to the customer for a UGC uploader. In this embodiment, the customer may decide whether or not to send the UGC uploader to the customer In an embodiment, the specialized computer system 106 is configured to select a pre-authorized user for sending the UGC uploader based on a user selection parameter. The user selection parameter is at least one of a profile of the pre-authorized user, a rating of the pre-authorized user and social network activity of the pre-authorized user. The profile of the pre-authorized user includes, but is not limited to his name, age, sex, geographic location, nationality, ethnicity, computing devices owned and so forth. The rating of the pre-authorized user is a performance rating provided by the SCMS 104. Typically, the rating of the pre-authorized user has a numerical value and is based on the user-generated content send by the pre-authorized user to the SCMS 104. Typically, the social network activity of the pre-authorized user has a numerical value based on how active the pre-authorized user is on the social media network. The social media activity is based on parameters such as, volume of content share on the social media network, number of connections or followers on the social media network and so forth.

In an embodiment, the SCMS 104 makes the UGC uploader available for download for the pre-authorized user and sends details about downloading the UGC uploader to the pre-authorized user. Typically, the customer specifies one or more pre-authorized users for sending the UGC uploader. In an embodiment, the SCMS 104 enables the customer to form a trusted social network of the customer. The trusted social network of the customer includes the customer and one or more pre-authorized users. The one or more pre-authorized users have an established trust relation with the customer such that the pre-authorized user is allowed to send the user-generated content for the customer. In an embodiment, the customer selects a pre-authorized user from the one or more pre-authorized users of his trusted social network to send the UGC uploader.

At step 608, the SCMS 104 receives the user-generated content from the pre-authorized user. Typically, the pre-authorized user sends the user-generated content utilizing the UGC uploader. At step 610, the SCMS 104 associates the user-generated content with the customer. Typically, the said association is based on the encoding of the user-generated content wherein the encoding uniquely identifies the user-generated content with the customer.

At step 612, the SCMS 104 compares the user-generated content with a required specification of the user-generated content. The comparison is done to determine that the user-generated content meets the required specification of the user-generated content. Typically, if the user-generated content does not match the required specification, then the customer does not use the user-generated content in the social media campaign.

At step 614, the SCMS associates metadata with the user-generated content. Thereafter, at step 616, the SCMS 104 stores the user-generated content at the cloud-based social media content repository 108. The cloud-based social media content repository 108 is coupled with the specialized computer system 106. The cloud-based social media content repository 108 provides an interface with the digital media library 110. The interface enables the customer to access a third party content from the digital media library 110.

At step 620, the SCMS 104 utilizes the user-generated content in a social media campaign of the customer. In an embodiment, the SCMS 104 utilizes the third party content in the social media campaign of the customer. In an embodiment the user-generated content used by the customer 112 is attributed to the pre-authorized user who created the content. Typically, utilizing the user-generated content in the social media campaign of the customer includes accessing social media campaign tools, creating the social media campaign, selecting a social media network for launching the social media campaign, launching the social media campaign, modifying the social media campaign, managing the social media campaign, and terminating the social media campaign. In an embodiment, the specialized computer system 106 automatically uses the received user-generated content in a social media campaign of the customer when the user-generated content meets predefined parameters set by the customer. Thereafter, the method 600 terminates at step 622.

Figure 7A:
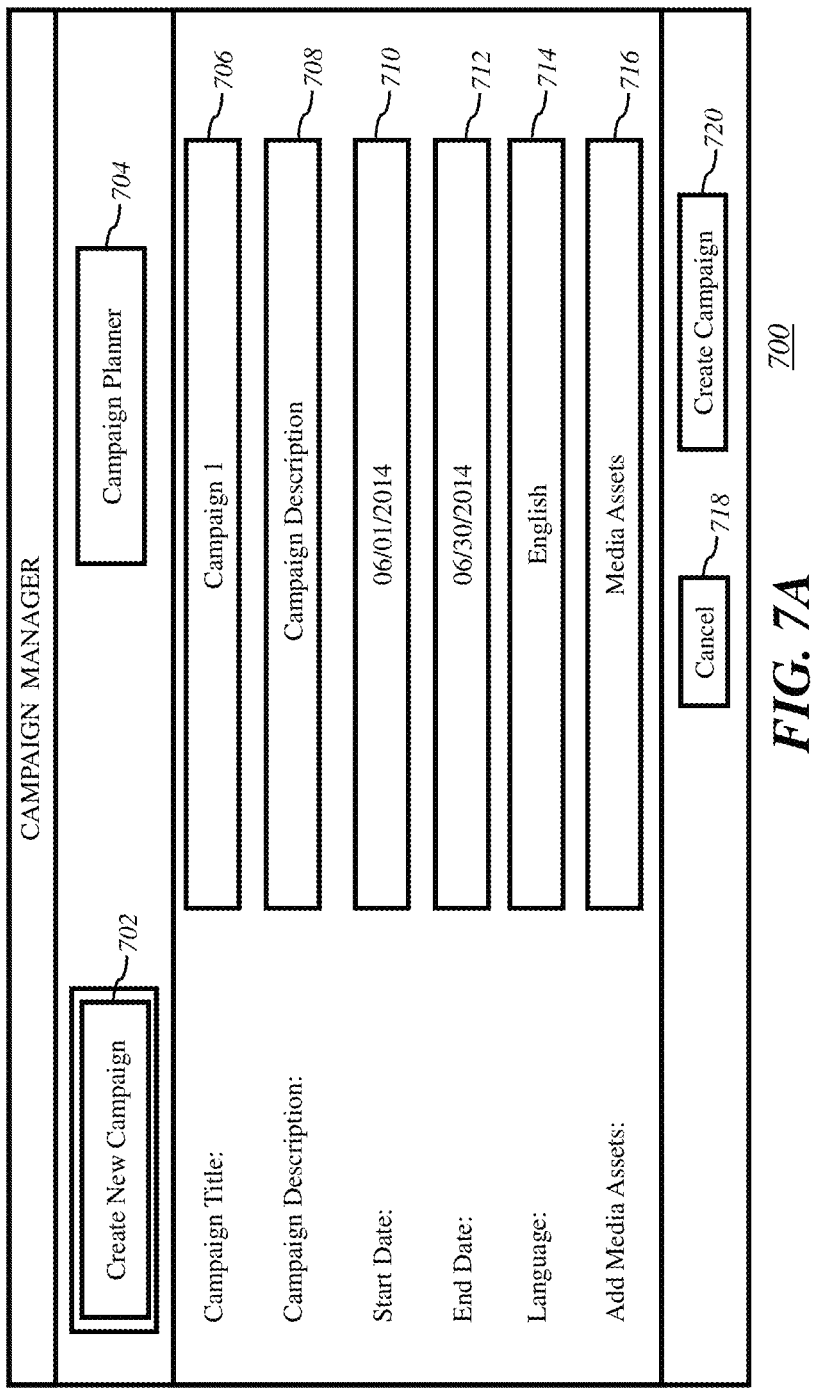
FIG. 7A is a block diagram illustrating Campaign Manager interface 700, in accordance with an embodiment.

FIG. 7A is a block diagram illustrating the Campaign Manager interface 700, in accordance with an embodiment. The campaign manger 224 enables the customer to manage the social media campaign. Typically, the customer creates the social media campaign by providing details of the social media campaign using the campaign manger interface 700.

The campaign manger interface 700 is shown to include a Create New Campaign button 702 and a Campaign Planner button 704. Once the customer selects the Create new campaign button 702, the campaign manager interface 700 provides a user interface to the customer to provide details of the social media campaign. Once the customer selects the Create new campaign button 702, the campaign manager interface 700 enables the marketing professional to enter details of the social media campaign.

The campaign manager 700 provide a campaign title text box 706, a campaign description text box 708, a start date box 710, an end date box 712, a language box 714, and add media assets button 716. The campaign title text box 706 is to provide a title of the social media campaign. The campaign description text box 708 is to provide a description of the social media campaign. The start date text box 710 is to provide a start date for the social media campaign. The End date text box is to provide an end date for the social media campaign. The language text box is to provide a language of the social media campaign.

The Add media assets button 716 enables the customer to add a user-generated content to the social media campaign. On selecting the add media assets button 716, the customer gets an access to the user-generated content in the cloud-based social media content repository 108. The customer may then select a user-generated content to use in his social media campaign. Finally the customer may select a create campaign button 720 to create the social media campaign. The customer may select a cancel button 718 in case he does not want to create the social media campaign.

Figure 7B:
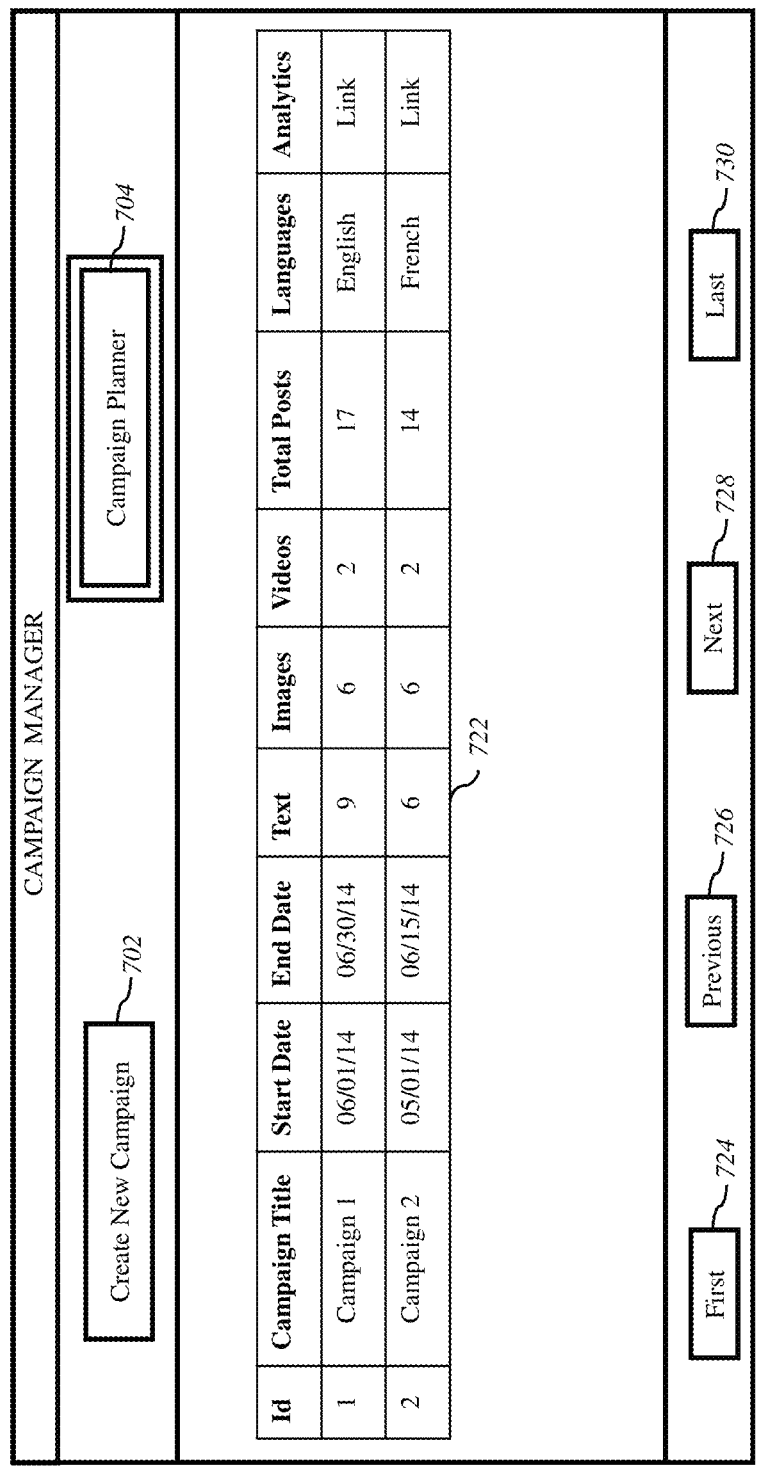
FIG. 7B is a block diagram illustrating the Campaign Manager interface 700, in accordance with another embodiment.

FIG. 7B is a block diagram illustrating the Campaign Manager interface 700, in accordance with another embodiment. The campaign manager interface is shown to include the create new campaign button 702, the campaign planner button 704, a campaign summary table 722, a first button 724, a previous button 726, a next button 728 and a last button 730.

In an embodiment, when the marketing professional selects the campaign planner button 704 then the campaign manager interface 700 displays the campaign summary table 722. The campaign summary table 722 provides details of one ore more social media campaigns of the customer. The campaign summary table 722 provides details such as, campaign title, start date, end date, language. The campaign summary table 722 also provides summary of the user-generated content associated with the social media campaign, such as, count of text messages, count of images, count of videos and total count of all user-generated content associated with a social media campaign. The campaign summary table 722 further provides a link to a dashboard for displaying analytics of the social media campaign. In an embodiment, the customer may select a social media campaign displayed in the campaign summary table 722 to access details of the selected social media campaign. A first button 724, a previous button 726, a next button 728 and a last button 730 enable the customer to scroll through the social media campaigns listed in the campaign summary table 722.

Figure 8:
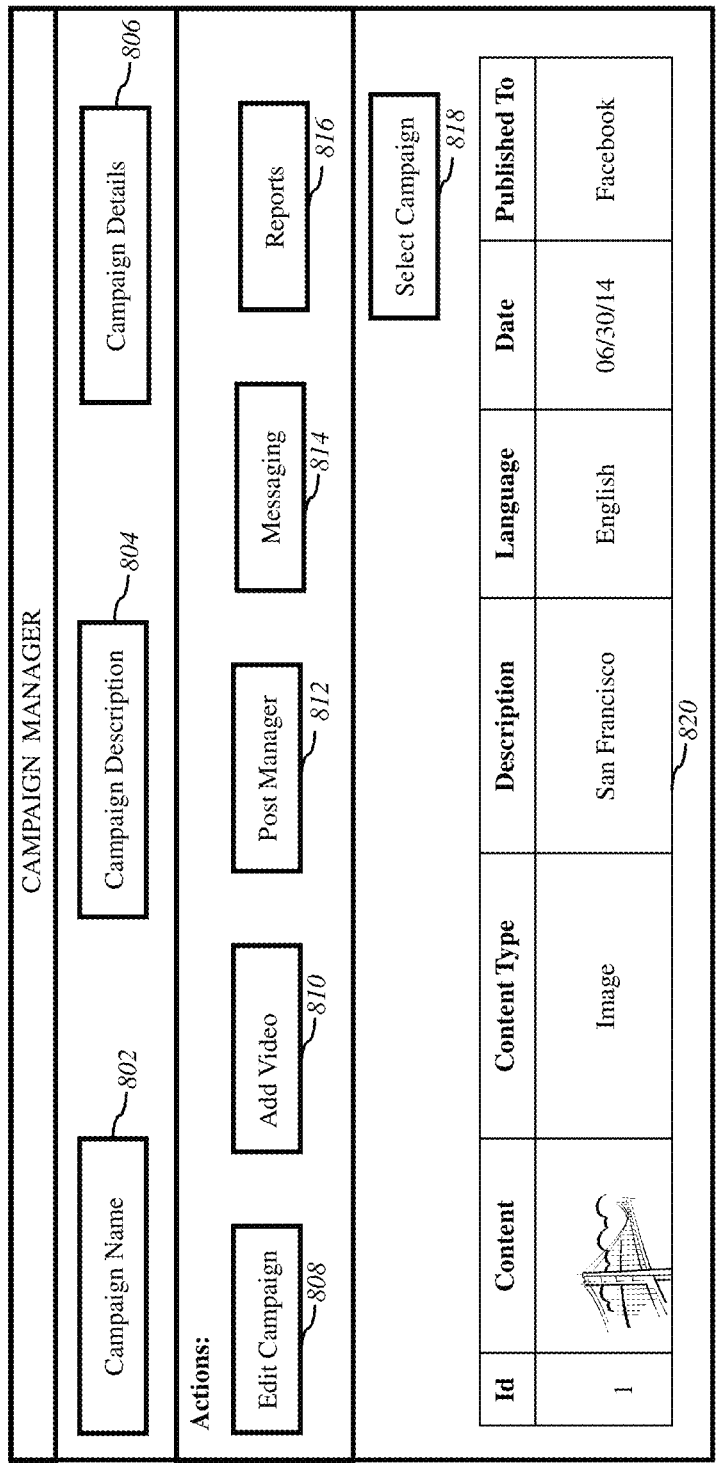
FIG. 8 is a block diagram illustrating Campaign Manager interface 800, in accordance with an embodiment.

FIG. 8 is a block diagram illustrating the Campaign Manager interface 800, in accordance with an embodiment. The campaign manager interface 800 enables the customer to access details of the social media campaign. The campaign manager interface 800 includes a campaign name section 802 providing the name of the social media campaign, a campaign description section 804 providing description of the social media campaign, a campaign details section 806 providing details of the social media campaign.

The campaign manager interface 800 also includes an edit campaign button 808, an add video button 810, a post manager 812, a messaging button 814, a reports button 816, a select campaign menu 818 and campaign viewer section 820.

The customer 112 may edit the social media campaign by selecting the edit campaign button 808, add video to the social media campaign by selecting the add video button 810, access a post manager interface by selecting the post manager button 812, view one or more messages associated with the social media campaign by selecting the messaging button 814, and access a dashboard displaying analytics of the social media campaign by selecting the reports button 816. Typically, the one or more messages associated with the social media campaign include the messages posted by the members of the social media network participating in the social media campaign.

The select campaign menu 818 provides a list of social media campaigns to the customer. Once the customer selects a social media campaign from this list the details of the selected social media campaign are displayed in the campaign viewer section 820. In an embodiment, the campaign viewer section 820 provides details of the user-generated content in the social media campaign, such as content preview, content type, description, language, date, and the social media network where the user-generated content was published.

Figure 9:
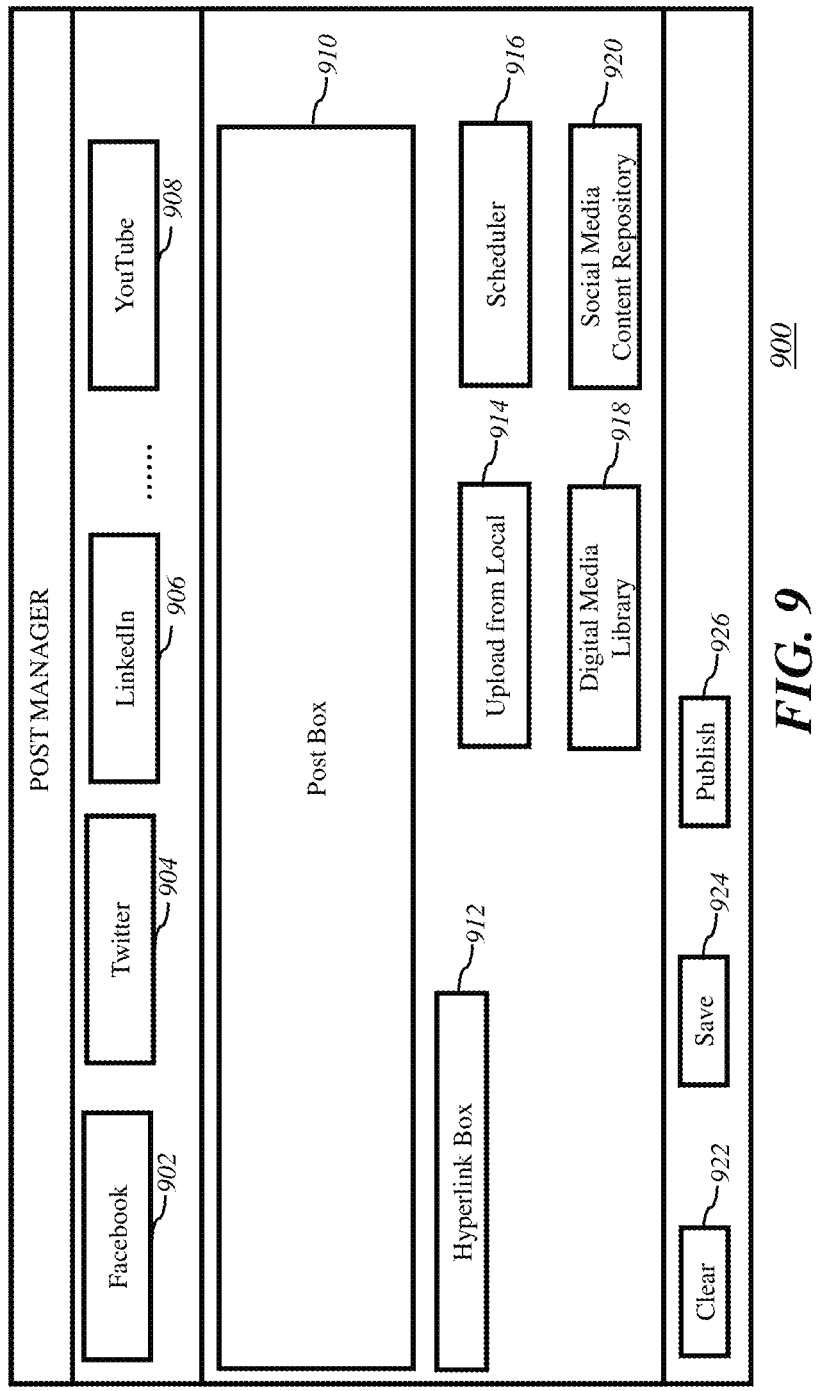
FIG. 9 is a block diagram illustrating Post Manager interface 900, in accordance with an embodiment.

FIG. 9 is a block diagram illustrating Post Manager interface 900, in accordance with an embodiment. The post manager interface includes a plurality of social media integration buttons. For example, the integration button 902, integration button 904, integration button 906 and integration button 908. The social media integration button integrates the post manager interface 900 with the social media network to publish the user-generated content. Typically, the user-generated content specified by the customer is published on the social media network. For example integration button 902 integrates with Facebook®, the integration button 904 integrates with Twitter®, the integration button 906 integrates with LinkedIn®, and the integration button 908 integrates with YouTube®.

The post manager interface 900 also includes a post box 910, a hyperlink box 912, and upload button 914, a scheduler button 916, a digital media library button 918, a social media content repository button 920, a clear button 922, a save button 924, and a publish button 926.

The post box 910 enables the customer to input text to be published on a selected social media network. The customer may also enter a hyperlink in the hyperlink box 912. Once the customer has entered the text and/or the hyperlink he may select the integration button 904 to publish the text for the social media campaign running on Twitter®.

In an embodiment, the customer may select the upload button 914 to select a user-generated content stored in computing device of the customer. The customer may select the digital media library button 918 to access and select the user-generated content stored in the digital media library 110. The customer may also select the user-generated content stored in the cloud-based social media content repository 108 by selecting the social media content repository button 920. In an embodiment, the user-generated content selected by the customer from the cloud-based social media content repository 108 and the digital media library is added to the social media campaign. In an embodiment, the customer may also select the scheduler button 916 to specify the date and time of posting of the user-generated content. In another embodiment, the customer may select the publish button 926 to publish the user-generated content on the social media network as a part of the social media campaign.

Figure 10:
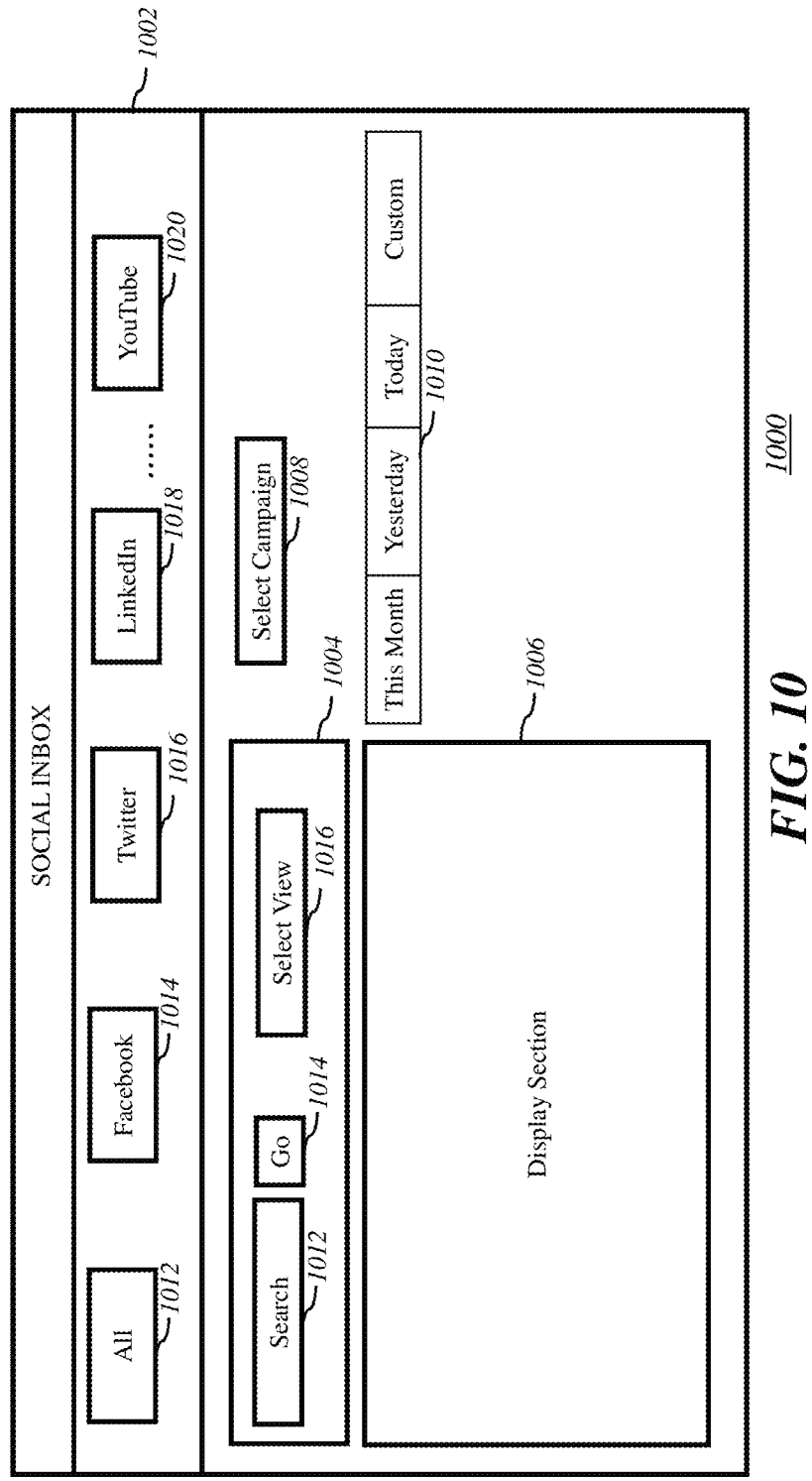
FIG. 10 is a block diagram illustrating Social Inbox 1000, in accordance with an embodiment.

FIG. 10 is a block diagram illustrating an interface of Social Inbox 1000, in accordance with an embodiment. In an embodiment, the interface of social inbox 1000 fetches the content posted on by members of one or more social media network and present it to the customer. It also enables the customer reply to the content posted by the members of the one or more social media network. The interface for social inbox 1000 includes a social media section 1002, a view option section 1004, a display section 1006, campaign selection section 1008 and a time selection section 1010.

The social media section 1002 includes a plurality of social media selection buttons, for example, an all social media selection button 1012, a social media selection button 1014, a social media selection button 1016, a social media selection button 1018, and a social media selection button 1020. When the customer selects a social media selection button, for example social media selection button 1014 then details of social media campaigns of the selected social media are displayed in a display section 1006. When the customer selects the all-social media selection button 1012 then details of all social media campaigns are displayed in a display section 1006. Typically, details of the social media campaign include, but are not limited to content posted by the customer 112 for the social media campaign, content posted by members of the social media campaign and other updates and notifications about the social media campaign. In an embodiment, the details of the social media campaign are email notifications. In another embodiment, the details of the social media campaign are in message notifications.

The view option section 1004 includes a search box 1022, a GO button 1024 and a select view section 1026. The search box enables a keyword search within the details of the content displayed in the display section 1006. Once the customer select the Go button 1024 the keyword search is initiated. The select view section 1026 enables the customer to select one of email notifications and message notifications to be displayed in the display section 1006.

The campaign selection section 1008 enables the customer to select a social media campaign. Typically, the display section displays the details of the selected social media campaign in the display section 1006. The time selection section 1010 enables the customer to select the time period, for example, today, yesterday, this month etc. to display the details of the social media campaign in the display section 1006 for the selected time period.

Figure 11:
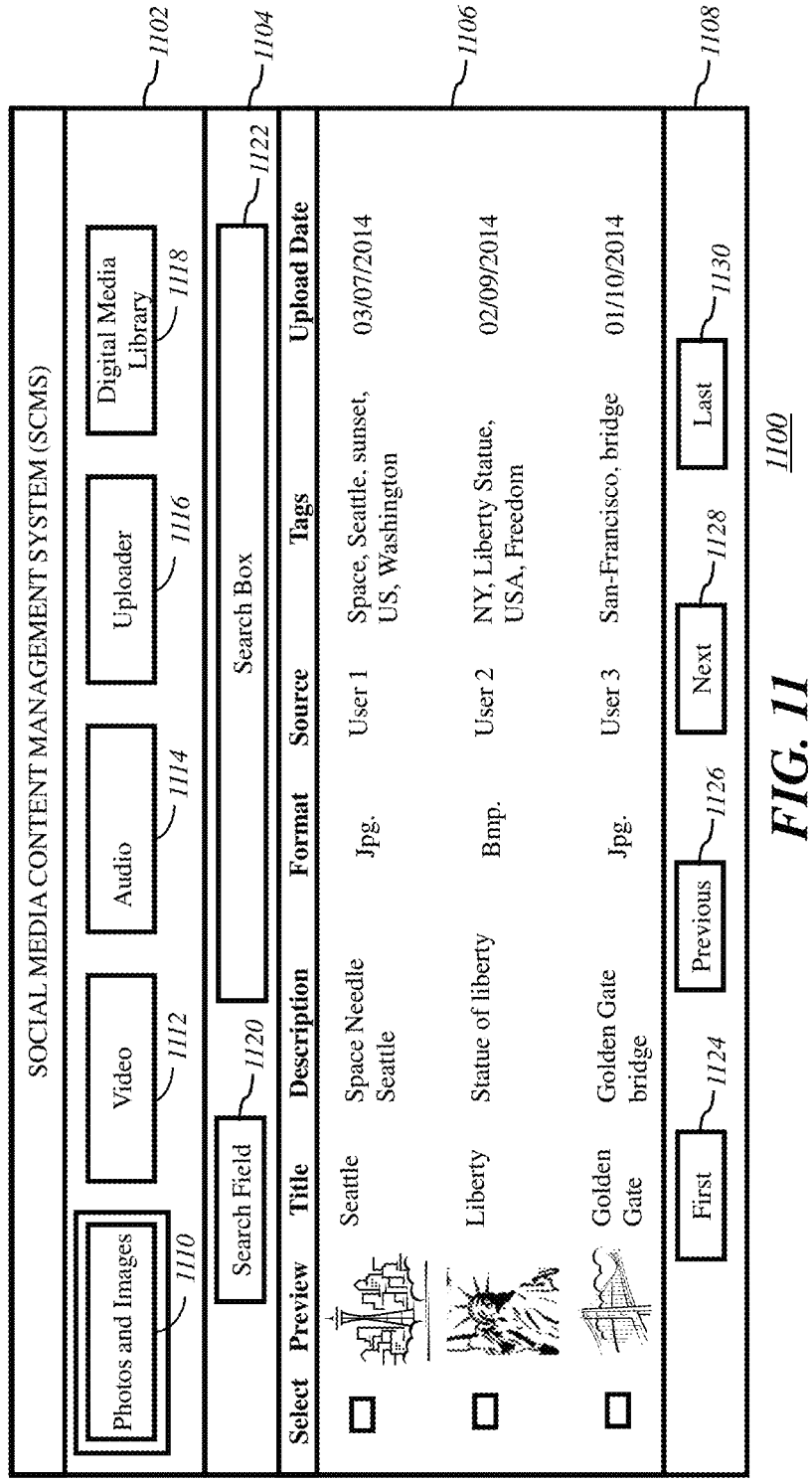
FIG. 11 is a block diagram illustrating the SCMS interface 1100, in accordance with an embodiment.

FIG. 11 is a block diagram illustrating SCMS interface 1100, in accordance with an embodiment. Typically, the SCMS interface 1100 enables the customer, for example customer 112 to manage the user-generated content. In an embodiment, the specialized computer system 106 provides the SCMS interface 1100. The SCMS interface enables organizing the user-generated contents based on classification parameters specified by the customer 112. Typically, a classification parameter includes at least one of the user-generated content, a consumer brand, a social media campaign, a geographic location, demography, the social media campaign schedule, and a social media network.

The SCMS interface includes a content selection section 1102, a content search section 1004, a content display section 1006, and a view option section 1008.

The content selection section 1102 includes a Photo and images button 1110, a video button 1112, an audio button 1114, an uploader button 1116, and a digital media library button 1118. When the customer selects the photo and images button 1110, the content display section 1106 displays the photos and images from the cloud-based social media content repository 1110. When the customer selects the video button 1112, the content display section 1106 displays videos from the cloud-based social media content repository 1110. When the customer selects the audio button 1114, the content display section 1106 displays the audio files from the cloud-based social media content repository 108.

The uploader button 1116 enables the customer to upload user-generated content, stored in the computing device of the customer, to the cloud-based social media content repository 108. Typically, on selecting the uploader button 1116 an upload sub-window is displayed which enables the customer to browse, select and upload a user-generated content stored in his computing device. In an embodiment, the customer can associate metadata while uploading the user-generated content. Typically, the customer specifies the title, description and the tags for the user-generated content.

The Digital media library button 1118 enables the customer to procure content from the digital media library 110. Typically, on selecting the digital media library button 1118, a digital media library sub-window is displayed which enables the customer to search for content, select content, pay for the content, and procure content from the digital media library 110. Typically, the procured content is stored in the cloud-based social media content repository 108.

The content search section 1104 enables the customer to search for user-generated content in the cloud-based social media content repository 108. The content search section 1104 includes a search field section 1120 and a search box 1122. The content search section 1004 enables the customer to select a field, for example, title, description, source, tags and so forth to conduct keyword search. The search box 1122 enables the customer to input keywords for the search.

The content display section 1106 displays the user-generated content from the cloud-based social media content repository 108. Typically, the user-generated content displayed depends on the selection of the marketing profession in the content selection section 1102. For example, when the customer selects Audio in the content selection section then only audio files are displayed in the content display section 1106. In an embodiment, when the customer searches for content using the content search section 1104 then the user-generated content that matches the search criteria, for example keywords are displayed in the content display section 1106. In an embodiment, the content display section 1106 displays details of the user-generated content, such as preview, title, description, format, source, tags, and upload date.

The view option section 1008 enables the customer to scroll through the content displayed in the content display section 1006. In an embodiment, the customer may select the first button 1124, previous button 1126, next button 1128 and the last button 1130 to scroll through the user-generated content displayed in the content display section 1106.

Figure 12:
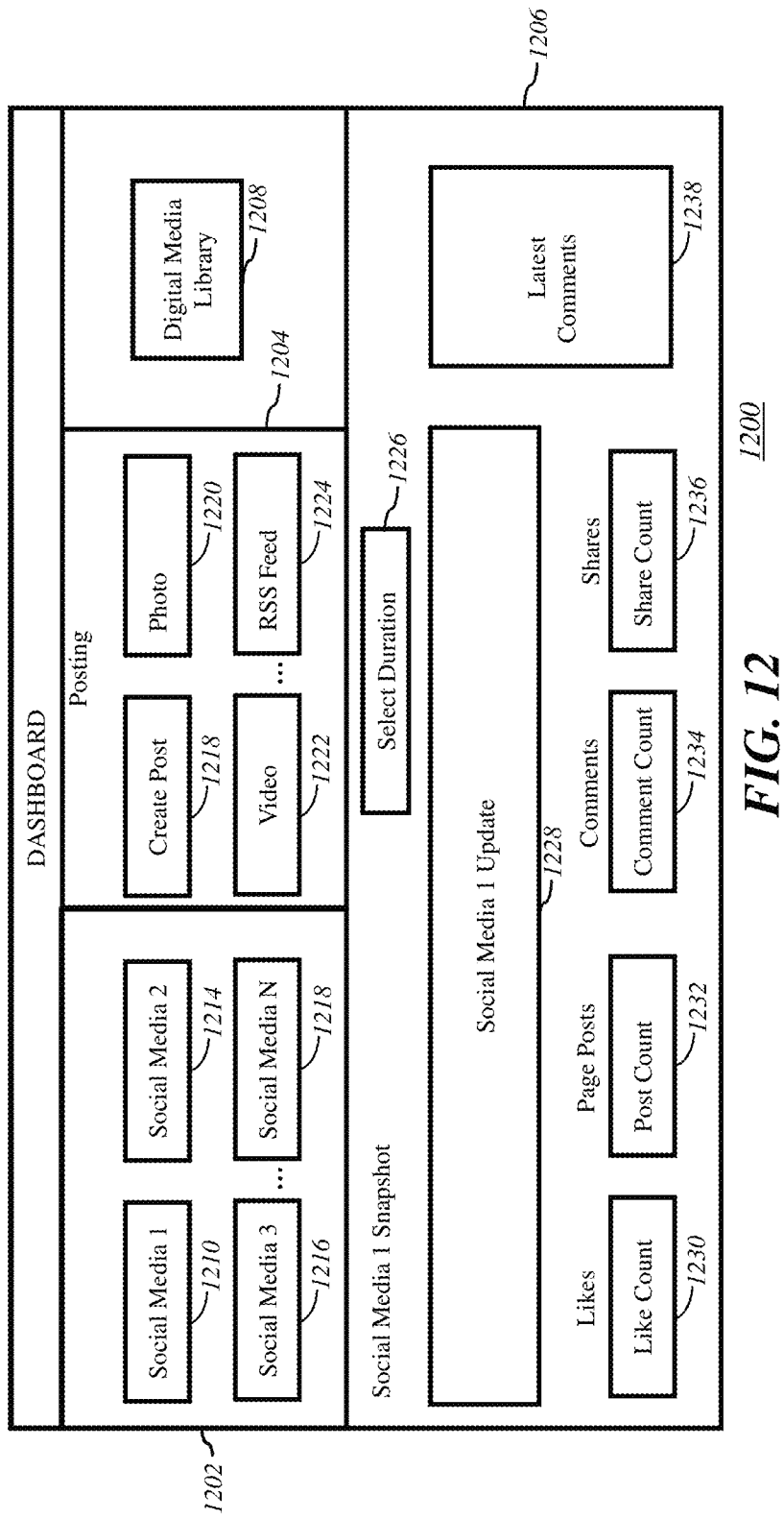
FIG. 12 is a block diagram illustrating a Dashboard 1200, in accordance with an embodiment.

FIG. 12 is a block diagram illustrating a Dashboard interface 1200, in accordance with an embodiment. Typically, the dashboard interface 1200 displays analytics of the social media campaign. The dashboard interface 1200 includes a social media section 1202, a posting section 1204, a social media snapshot section 1206, and a digital media library button 1208.

The social media section 1202 includes a plurality of buttons to select a social media network for viewing the analytics of the social media campaign running on the selected social media network. For example, the social media section 1202 is shown to include a social media selection button 1210, a social media selection button 1212, a social media selection button 1214, and a social media selection button 1216. When a customer selects a social media button, for example, the social media button 1210, then the analytics of the social media campaign of the selected social media are displayed on the social media snapshot section 1206.

The posting section 1204 provides a plurality of buttons that enable the customer to manage user-generated content in the SCMS 104. The posting section includes a create post button 1218, a photo button 1220, a video button 1222, and a RSS feed button 1224. In an embodiment, the Create Post button 1218 enables a customer to publish user-generated content on a social media network. Typically, when the customer selects the Create Post button 1218, the post manager interface 900 is displayed and enables the customer to create a post. In an embodiment, the photo button 1220 links to the photos and images stored in the cloud-based social media content repository 108. The Video button 1222 links to the video files stored in the cloud-based social media content repository 108. The RSS feed button 1224 links to the Rich Site Summary (RSS) content manager and enables the customer to manage content received from RSS feeds. Typically, the RSS feeds are stored in the cloud-based social media content repository 108.

The social media snapshot section 1206 displays the analytics of the social media campaign. The social media snapshot section 1206 includes a select duration section 1226, a social media update section 1228, a like count section 1230, a post count 1232, a comment count 1234, a share count section 1236 and a latest comment section 1238.

The select duration section 1226 enables the customer to select time duration for viewing the analytics of the social media campaign. The social media update section 1228 displays updates about the social media campaign for a selected social media network. The social media update section provides a consolidated views and analysis of data about the selected social media campaign. In an embodiment, the analysis is presented in a graphical format. Typically, the analysis of the data is based on the social media network selected in the social media section 1202.

In an embodiment, the like count section 1230 provides the aggregate count of the number of likes received on the social media campaign, for example a Facebook® campaign. The post count 1232 depicts the aggregate count of the posts on the social media campaign, for example a social media campaign on Facebook®. The comment count 1234 displays the aggregate count of the comments posted by users of social media network on the social media campaign. The share count section 1236 provides an aggregate count of the number of times a user-generated content of the social media campaign was shared by the users of the social media campaign. The latest comment section 1238 presents the recent messages posted by users of the social media network for the social media campaign.

The digital media library button 1208 provides a link to the digital media library and enables the customer to access the content stored in the digital media library 110.

FIG. 13 is a block diagram illustrating a Campaign Reporter interface 1300, in accordance with an embodiment. The campaign reporter interface 1300 enables a customer to generate a report about the social media campaign. The campaign reporter interface 1300 includes a select campaign section 1302, a total videos section 1304, a total posts section 1306, a video published section 1308, a posted messages section 1310, a scheduled messages section 1312, a video status table 1314 and a post status table 1316.

The select campaign section 1302 enables the customer to select a social media campaign to generate a report. The total videos section 1304 provides a total count of the videos for the social media campaign. Typically, the total count of the videos includes the sum of videos published and videos that are to be published. Similarly, the total posts section 1306 provides a total count of the posts for the social media campaign. Typically, the total count of the posts includes the sum of posts published and posts that are to be published.

The video published section 1308 provides a count of videos that are already published on the social media network as part of the social media campaign. Similarly, the posted messages section 1310 provides a count of messages that are published on the social media campaign as part of the social media campaign. In an embodiment, the scheduled messages section 1312 provides a count of videos that are scheduled for publication in the social media campaign.

The video status table 1314 provides a tabular report of the videos of the social media campaign. The video status table has columns such as, social media, videos planned, not started, scheduled, in progress, and published. The social media column provides the name of the social media network, the videos planned provides the count of the videos planned to be published for the social media campaign, the not started column provides a count of the videos that are not scheduled for posting, the scheduled column provides the count of the videos that are scheduled for publication on the social media network, the in-progress column provides the count of the videos that are in-progress for publication on the social media network, and the published column provides the count of the videos published for the social media campaign.

The video status table 1316 provides a report of the posts of the social media campaign. The video status table has columns such as, social media, saved, scheduled, published, and status. The social media column provides the name of the social media network. The saved column provides the count of the saved posts. Typically, the posts are saved in the cloud-based social media content repository 108. The Scheduled column provide the count of the posts that are scheduled to be posted on the social media network and the published column provides the count of the posts that are published on the social media network. The status column provides whether the social media campaign has been "started" or "not started" on the social media network. Typically, a social media campaign starts when at least some content, for example a post or a video, is published on the social media network.

Figure 14:
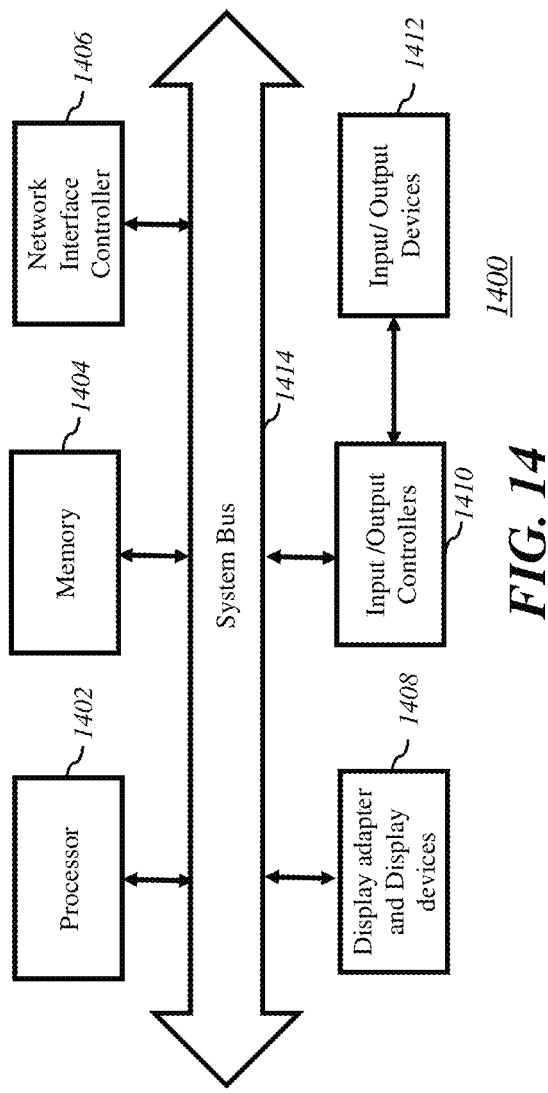
FIG. 14 is a block diagram illustrating a specialized computer system 1400 where various embodiments of the present invention can be practiced.

FIG. 14 is a block diagram illustrating the specialized computer system 1400 where various embodiments of the present invention can be practiced. The specialized computer system 1400 includes a system bus 1402, a processor 1404, a Memory 1406, a network interface controller 1408, a display adapter and display device 1410, input/output controllers 1412, and an input/output device 1414.

Embodiments of the present invention provide various steps and operations, which in turn may be translated into machine-readable and machine executable instructions. These instructions along with related data may be stored in the Memory 1406. Instructions and data may be placed into the Memory 1406 from the input/output devices 1414 (such as a keyboard, mouse) or a secondary storage device. The processor 1404 may interact with Memory 1406 to access both stored instructions and data. The processor 1404 may execute these stored instructions. The network interface controller 1408 may connect the specialized computer system 1400 to a communication network (e.g. Internet). The system bus 1402 facilitate in communication and moving data and instructions between the processor 1404, the Memory 1406, the Display adapter and display devices 1410, the Input/output controllers 1412, and the Network interface controller 1408.

In the foregoing specification, the invention and its benefits and advantages have been described with reference to specific embodiments. However, one with ordinary skill in the art would appreciate that various modifications and changes can be made without departing from the scope of the present invention, as set forth in the claims. Accordingly, the specification and the figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

I claim:

1. A social media content management system (SCMS), the SCMS being operatively connected to one or more social media networks through a communication network, the SCMS comprising:

a specialized computer system coupled with the communication network, wherein the specialized computer system manages user-generated content (UGC) in the communication network, the specialized computer system is configured for:

determining uploader preference for generating a UGC uploader, wherein a UGC uploader enables a pre-authorized user to upload a user-generated content for a customer, wherein the UGC uploader includes instructions for encoding the user-generated content to uniquely identify the user-generated content with the customer, wherein the customer is associated with the SCMS, and wherein the pre-authorized user has an established trust relationship with the customer such that the pre-authorized user is allowed to send the user-generated content for the customer;

generating the user-generated content uploader based on the uploader preference;

sending the UGC uploader to the pre-authorized user;

receiving the user-generated content from the pre-authorized user, wherein the pre-authorized user sends the user-generated content using the UGC uploader; and using the user-generated content in a social media campaign of the customer; and a cloud-based social media content repository coupled with the specialized computer system, wherein the cloud-based social media content repository is for:

storing the user-generated content such that the user-generated content is accessible to the customer; and storing information about the social media campaign of the customer.

2. The SCMS according to claim 1, wherein the specialized computer system is configured to include a required specification of the user-generated content in the UGC uploader so that the required specification of the user-generated content is delivered to the pre-authorized user, and wherein the UGC uploader sends the user-generated content for the customer when the user-generated content meets the required specification.

3. The SCMS according to claim 2, wherein the required specification of the user-generated content comprises at least one of from the group comprising a required format of the user-generated content, a required content of the user-generated content, and a predefined set of rules for the user-generated content.

4. The SCMS according to claim 3, wherein the required format of the user-generated content is one of from the group comprising: an image format, a text format, an audio format, a video format, and a custom format.

5. The SCMS according to claim 1, wherein instructions for encoding the user-generated content comprises instruction for encoding the user-generated content using a key, wherein the key indicates that the user-generated content is encoded for the customer.

6. The SCMS according to claim 1, wherein the UGC uploader is configured to associate metadata with the user-generated content, wherein the metadata is based on at least one of from the group comprising: the pre-authorized user, the customer, the user-generated content, a consumer brand associated with the user-generated content, purpose of the user-generated content, time of creation of the user-generated content, author of the user-generated content, software environment of creation of the user-generated content, hardware environment of creation of user-generated content, and a standard associated with the user-generated content.

7. The SCMS according to claim 6, wherein the customer specifies the metadata to be associated with the user-generated content.

8. The SCMS according to claim 1, wherein the specialized computer system is configured to organize the user-generated content based on classification parameters specified by the customer, wherein a classification parameter is at least one of from the group comprising the user-generated content, a consumer brand, a social media campaign, a geographic location, a demography, the social media campaign, and a social media network.

9. The SCMS according to claim 1, wherein the uploader preference specifies one or more functionalities of the UGC uploader, wherein a functionality is at least one of from the group comprising capturing an image, recording a video, recording an audio, and receiving text input.

10. The SCMS according to claim 1, wherein the UGC uploader integrates with a computing device of the pre-authorized user, wherein the UGC uploader accesses the user-generated content stored in the computing device of the pre-authorized user to upload the user-generated content for the customer.

11. The SCMS according to claim 1, wherein the specialized computer system is configured to select the pre-authorized user for sending the UGC uploader based on a user selection parameter, wherein the user selection parameter is at least one of from the group comprising a profile of the pre-authorized user, a user rating of the pre-authorized user and social network activity of the pre-authorized user.

12. The SCMS according to claim 1, wherein the UGC uploader is one of from the group comprising a mobile application, a desktop application, and a wearable computer application.

13. The SCMS according to claim 1, wherein the UGC uploader is customized for the customer, and wherein the UGC uploader is limited to upload the user-generated content for the customer.

14. The SCMS according to claim 1, wherein the UGC uploader is deactivated after uploading the user-generated content such that the UGC uploader is not available for subsequent use of the pre-authorized user.

15. A method for managing user-generated content using a Social Media Content Management System (SCMS), the SCMS being operatively connected to one or more social media networks through a communication network, the method comprising, at the SCMS:
using a specialized computer system, generating a user-generated content (UGC) uploader based on an uploader preference, wherein the UGC uploader enables a pre-authorized user to upload user-generated content for a customer, wherein the UGC uploader includes instructions for encoding the user-generated content to uniquely identify the user-generated content with the customer, and wherein the customer is associated with the SCMS, and wherein the pre-authorized user has an established trust relationship with the customer such that the pre-authorized user is allowed to send the user-generated content for the customer;
using the specialized computer system, sending the UGC uploader to the pre-authorized user;
using the specialized computer system, receiving the user-generated content from the pre-authorized user, wherein the pre-authorized user uploads the user-generated content using the UGC uploader;
using the specialized computer system, storing the user-generated content in a cloud based social media content repository coupled with the specialized computer system such that the user-generated content is accessible to the customer; and
using the specialized computer system, utilizing the user-generate content in a social media campaign of the customer.

16. A non-transitory computer-readable storage medium storing instructions for providing a user-generated content (UGC) uploader, the instructions when executed by a processor cause the processor to perform operations comprising:
determining uploader preference for generating a UGC uploader, wherein the uploader preference specifies one or more functionalities of the UGC uploader, wherein a functionality is at least one of from the group comprising capturing an image, recording a video, recording an audio, and receiving text input;
determining a required specification of user-generated content, wherein the required specification of the user-generated content comprises at least one of from the group comprising a required format of the user-generated content, a required content of the user-generated content, and a predefined set of rules for the user-generated content;
encoding the user-generated content to uniquely identify the user-generated content with a customer, wherein the customer is associated with a social media content management system (SCMS), and wherein the pre-authorized user has an established trust relationship with the customer such that the pre-authorized user is allowed to send the user-generated content for the customer;
saving the user-generated content in a UGC database associated with the pre-authorized user; and
sending the user-generated content to the SCMS.

17. The computer readable storage media of claim 16 wherein instructions for determining uploader preference further comprising instructions for specifying one or more functionalities of the UGC uploader, wherein a functionality is at least one of from the group comprising capturing an image, recording a video, recording an audio, and receiving text input.

18. The computer readable storage media of claim 16 further comprising instructions when executed by the processor cause the processor to perform operations comprising associating metadata with the user-generated content, wherein the metadata is based on at least one of from the group comprising: the pre-authorized user, the customer, the user-generated content, a consumer brand, purpose of the user-generated content, time of creation of the user-generated content, author of the user-generated content, software environment the user-generated content, hardware environment of the user-generated content, and a standard associated with the user-generated content.

19. The computer readable storage media of claim 16 further comprising instructions when executed by the processor cause the processor to perform operations comprising encoding the user-generated content using a key, wherein the key indicates that the user-generated content is encoded for the customer.

20. The computer readable storage media of claim 16 further comprising instructions when executed by the processor cause the processor to perform operations comprising:
  selecting a compression parameter for the user-generated content; and
  compressing the user-generated content using the selected compression parameter prior to sending the user-generated content to the SCMS.

\* \* \* \* \*